(12) United States Patent  (10) Patent No.: US 7,571,432 B2
Heishi et al.  (45) Date of Patent: Aug. 4, 2009

(54) COMPILER APPARATUS FOR OPTIMIZING HIGH-LEVEL LANGUAGE PROGRAMS USING DIRECTIVES

(75) Inventors: Taketo Heishi, Osaka (JP); Hajime Ogawa, Suita (JP); Yasuhiro Yamamoto, Kyoto (JP); Kyoko Hattori, Kobe (JP); Shohei Michimoto, Takatsuki (JP); Kenji Hattori, Osaka (JP); Hirotetsu Tomita, Nishinomiya (JP); Teruo Kawabata, Suita (JP); Kiyoshi Nakashima, Takatsuki (JP)

(73) Assignee: Panasonic Corporation, Osaka (JP)

( * ) Notice: Subject to any disclaimer, the term of this patent is extended or adjusted under 35 U.S.C. 154(b) by 816 days.

(21) Appl. No.: 10/944,831

(22) Filed: Sep. 21, 2004

(65) Prior Publication Data

US 2005/0086653 A1  Apr. 21, 2005

(30) Foreign Application Priority Data

Oct. 17, 2003 (JP) .............................. 2003-357323

(51) Int. Cl.
*G06F 9/45* (2006.01)
(52) U.S. Cl. ...................... 717/151; 717/140; 717/150; 717/160
(58) Field of Classification Search .......... 717/136–161
See application file for complete search history.

(56) References Cited

U.S. PATENT DOCUMENTS

| | | | | |
|---|---|---|---|---|
| 5,530,964 A * | 6/1996 | Alpert et al. | ................. | 717/158 |
| 5,862,385 A | 1/1999 | Iitsuka | | |
| 5,930,507 A | 7/1999 | Nakahira et al. | | |
| 6,266,790 B1 | 7/2001 | Nimoda | | |
| 6,282,707 B1 * | 8/2001 | Isozaki | ....................... | 717/157 |

(Continued)

FOREIGN PATENT DOCUMENTS

CN  1228558  9/1999

(Continued)

OTHER PUBLICATIONS

McKinley, A compiler optimization algorithm for shared-memory multiprocessors, Aug. 1998, IEEE, pp. 769-787.*

(Continued)

*Primary Examiner*—Wei Y Zhen
*Assistant Examiner*—Satish Rampuria
(74) *Attorney, Agent, or Firm*—Wenderoth, Lind & Ponack, L.L.P.

(57) ABSTRACT

A compiler 58, which is a compiler that realizes program development in a fewer man hours, translates a source program 72 written in a high-level language into a machine language program. This compiler 58 is comprised of: a directive obtainment unit that obtains a directive that a machine language program to be generated should be optimized; a parser unit 76 that parses the source program 72; an intermediate code conversion unit 78 that converts the source program 72 into intermediate codes based on a result of the parsing performed by the parser unit 76; an optimization unit 68 that optimizes the intermediate codes according to the directive; and a code generation unit 90 that converts the intermediate codes into the machine language program. The above directive is a directive to optimize the machine language program targeted at a processor that uses a cache memory.

49 Claims, 22 Drawing Sheets

U.S. PATENT DOCUMENTS

| | | | |
|---|---|---|---|
| 6,341,371 B1 * | 1/2002 | Tandri | 717/158 |
| 6,367,071 B1 * | 4/2002 | Cao et al. | 717/160 |
| 6,499,085 B2 * | 12/2002 | Bogin et al. | 711/118 |
| 2002/0095559 A1 * | 7/2002 | Mekhiel | 711/168 |
| 2003/0233638 A1 | 12/2003 | Negishi | |
| 2005/0102657 A1 * | 5/2005 | Lewis | 717/140 |
| 2006/0206874 A1 * | 9/2006 | Klein | 717/136 |

FOREIGN PATENT DOCUMENTS

| | | |
|---|---|---|
| EP | 0 936 543 | 8/1999 |
| JP | 11-232117 | 8/1999 |
| JP | 2003-099269 | 4/2003 |

OTHER PUBLICATIONS

Nanri et al., Using cache optimizing compiler for managing software cache on distributed shared memory system, May 1997, IEEE, pp. 312-318.*

Hayashida, Optimizing method of C compiler for TRON achitecture, Dec. 1992, IEEE, pp. 70-76.*

Bagge et al., Design of the CodeBoost transformation system for domain-specific optimisation of C++ programs; IEEE, 2003, pp. 1-10.*

Memik et al., An integrated approach for improving cache behavior; IEEE, 2003, pp. 1-6.*

\* cited by examiner

FIG. 8A #pragma _loop_tiling [=NUM] NUM:Object volume
FIG. 8B #pragma _loop_tiling_times [=NUM] NUM:Number of loops

FIG. 9A
`#pragma _prof_loop_tiling`
FIG. 9B
(a)
```
for (i=0;i<5;++i) {
    for (j=0;j<1000;++j) {
        a[i]+=b[i]+c[j]
    }
}
```
— 72
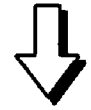
(b)
```
#pragma _prof_loop_tiling
for (i=0;i<5;++i) {
    #pragma _prof_loop_tiling
    for (j=0;j<1000;++j) {
        a[i]+=b[i]+c[j]
    }
}
```
— 72
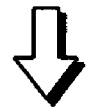 Compile
(c) Tuning hint information — 94

FIG. 10A  #pragma _prefetch  Variable name

FIG. 10B  #pragma _prefetch  Variable name=Cycles

FIG. 10C  void _dpref (Address, Size);

FIG. 10D  void _dpref_cyc (Address, Size, Cycles);

FIG. 10E
```
   . . .
   dpref (&a);
   . . .  ↑
   . . .  |
   . . .  | Specified number of cycles/
   . . .  | Default number of cycles
   . . .  |
   . . .  ↓
   ld  r0, (&a)
```

FIG. 11A  #pragma _loop_prefetch  Array name

FIG. 11B  #pragma _loop_prefetch  Array name=Cycles

FIG. 13A  −fprof−insert−dpref [=Cycles]

FIG. 13B  #pragma _prof_insert_dpref on

FIG. 13C  #pragma _prof_insert_dpref off

FIG. 13D  #pragma _prof_insert_dpref default

FIG. 13E
```
#pragma _prof_insert_dpref on
for (i=0;i<1000;i+=4) {
    c[i]=a[i]+a[i+1]+a[i+2]+a[i+3];
}
#pragma _prof_insert_dpref off
```
/72

FIG. 13F  void _prof_dpref (Address, Size)

FIG. 13G  void _prof_dpref_cyc (Address, Size, Cycles)

FIG. 15A  #pragma _overlap_access_object  Object name [, Object name]

FIG. 15B  #pragma _cache_set_number=NUM  Object name [, Object name]

FIG. 15C  #pragma _locate_address  Object name: Address

FIG. 15D  −fprof−data−locate

FIG. 16

```
#pragma _overlap_access_object a, b, c
int a[32], b[32], c[32];
void test(void)
{
    int i;
    for(i=0;i<32;i++){
            a[i]=b[i] * c[i];
    }
}
```

FIG. 17

| Group | 1 set (128 bytes) | | | |
|---|---|---|---|---|
| data_a | a[0] | a[1] | ... | a[31] |
| data_b | b[0] | b[1] | ... | b[31] |
| data_c | c[0] | c[1] | ... | c[31] |

FIG. 18

```
#pragma _cache_set_number=0 i
#pragma _cache_set_number=1 j
#pragma _cache_set_number=2 k
int i[32], j[32], k[32];
void test(void)
{
    int n;
    for(n=0;n<32;n++){
            i[n]=j[n]+k[n];
    }
}
```

FIG. 19A   #pragma _memory_area  Number Variable
           [, Variable,···]

FIG. 19B   −fprof−memory−area

FIG. 19C   #pragma _prof_memory_area  Variable
           [, Variable,···]

FIG. 21A  _trace_fill_writeback(Variable name or Address, Size);

FIG. 21B  _trace_fill_weaken(Variable name or Address, Size);

FIG. 21C  _trace_touch_writeback(Variable name or Address, Size);

FIG. 21D  _trace_touch_weaken(Variable name or Address, Size);

FIG. 21E  _region_writeback_invalidate(Variable name or Address, Size);

FIG. 21F  _region_invalidate(Variable name or Address, Size);

FIG. 21G  _region_touch(Variable name or Address, Size);

FIG. 21H  _region_fill(Variable name or Address, Size);

FIG. 22

```
test:
      wt  C0:C1 (TACM) , r0        mov r0 , ctrl_data
 [C0] wt  C2:C3 (TACSZ) , r1       mov r1 , size ;
 [C0] wt  C0:C1 (TACSTAD) , r2     mov r2 , start_adrs ;
 [C1] br  test
```

FIG. 23A  _prof_trace_fill_writeback(Variable name or Address, Size);

FIG. 23B  _prof_trace_fill_weaken(Variable name or Address, Size);

FIG. 23C  _prof_trace_touch_writeback(Variable name or Address, Size);

FIG. 23D  _prof_trace_touch_weaken(Variable name or Address, Size);

FIG. 23E  _prof_region_writeback_invalidate(Variable name or Address, Size);

FIG. 23F  _prof_region_invalidate(Variable name or Address, Size);

FIG. 23G  _prof_region_touch(Variable name or Address, Size);

FIG. 23H  _prof_region_fill(Variable name or Address, Size);

FIG. 24A    −fCacheConfigFile

FIG. 24B    cmp −fCacheConfigFile test.c

FIG. 24C
cache_size: 32768
line_size: 128
latency:  50
...
...

FIG. 24D    −fprof="Profile information file name"

FIG. 24E    −foutfile="Output file name"

COMPILER APPARATUS FOR OPTIMIZING HIGH-LEVEL LANGUAGE PROGRAMS USING DIRECTIVES

BACKGROUND OF THE INVENTION (1.) Field of the Invention

The present invention relates to a compiler apparatus that converts a source program written in high-level language such as the C language into a machine language program, and more particularly to an optimization directive to a compiler.

(2.) Description of the Related Art

There have been proposed a variety of high-level language compilers for compiling a source program written in high-level language into a machine language instruction sequence (See Japanese Laid-Open Patent application No. 2003-99269, for example).

However, such conventional high-level language compilers are not capable of taking into account the construction of hardware such as cache memory and the like in optimizing machine language instruction sequences for increasing execution speed and the like.

Therefore, in order to generate a machine language instruction sequence that takes into account hardware construction, it has been necessary to generate a program using assembly language and to create an algorithm that takes into account hardware construction, so as to generate a source program based on such created algorithm.

However, there is a problem that an enormous number of man-hours is required to develop a program using assembly language.

Furthermore, it is also a problem that a program written in assembly language provides low asset value because of its poor portability.

Moreover, in the present age in which the scale as well as construction of hardware are becoming larger and more complicated, it is not easy to create, by human hands, an algorithm that takes into account hardware and to carry out performance tuning based on such algorithm.

SUMMARY OF THE INVENTION

The present invention has been conceived in view of the above problems, and it is a first object of the present invention to provide a compiler apparatus that realizes program development in a fewer number of man-hours.

A second object of the present invention is to provide a compiler apparatus that generates programs with high asset value.

A third object of the present invention is to provide a compiler apparatus that does not require performance tuning to be carried out by human hands.

In order to achieve the above objects, the compiler apparatus according to the present invention is a compiler apparatus that translates a source program written in a high-level language into a machine language program, comprising: a directive obtainment unit operable to obtain a directive that the machine language program to be generated should be optimized; a parser unit operable to parse the source program; an intermediate code conversion unit operable to convert the source program into intermediate codes based on a result of the parsing performed by the parser unit; an optimization unit operable to optimize the intermediate codes according to the directive; and a code generation unit operable to convert the intermediate codes into the machine language program, wherein the directive is a directive to optimize the machine language program targeted at a processor that uses a cache memory.

With the above construction, intermediate codes are optimized based on a directive for optimization. Accordingly, it becomes possible to generate a machine language program that allows an efficient use of the cache memory simply by providing a directive, without needing to develop a program using assembly language. Thus, a fewer number of man-hours is required than in the case where program is developed using assembly language. Furthermore, by simply writing a source program in high-level language and providing a directive in the above manner, it is possible to generate a machine language program that allows an efficient use of the cache memory. This makes it possible to perform a variety of optimization by changing directives in various ways, which improves the asset value of programs. Furthermore, it becomes not necessary to carry out performance tuning by human hands.

Preferably, the directive obtainment unit obtains a directive that a specific loop process in the source program should be divided into a plurality of loop sub-processes so that data objects included in said loop process are laid in the cache memory in units of a predetermined data size, and the optimization unit divides, into a plurality of loop sub-processes, the loop process according to said directive, said loop process being a target of the directive obtained by the directive obtainment unit.

With the above construction, loop partitioning is performed so that data objects included in a loop process are laid in the cache memory at one time. Accordingly, it becomes possible to prevent a cache miss that is caused by the fact that a large number of data objects cannot be loaded into the cache memory at one time as a result of attempting to process such data objects at one time.

More preferably, the directive obtainment unit obtains a directive that a specific data object in the source program should be stored into the cache memory before said data object is referred to, and the optimization unit causes said data object to be stored into the cache memory before said data object is referred to.

Through this directive, it becomes possible to prevent the occurrence of hit miss caused by the fact that a data object to be used is not present in the cache memory at program execution time.

More preferably, the directive obtainment unit obtains (i) a directive that specific data objects in the source program should be placed into groups in units of a size of line data on the cache memory and that data objects placed into different groups should be laid in cache entries with different set numbers on the cache memory, and (ii) names of the specific data objects, and the optimization unit places the specific data objects that are specified by the respective names into groups in units of the size of line data on the cache memory, and lays said specific data objects on cache entries so that data objects placed into different groups are not laid in any cache entries with the same set number on the cache memory.

Accordingly, it becomes possible to prevent the occurrence of cache miss that is caused by conflicts in which data objects which are accessed at similar timings contend for a block with the same set number on the cache memory and try to flush other data objects.

More preferably, each of a plurality of cache entries in the cache memory includes a weak flag having a value indicating that a data object stored in each of said plurality of cache entries should be preferentially discarded, a main memory to be used by the processor includes (i) a weak space in which a data object stored therein is to be laid out in one of the cache entries in the cache memory and in which the weak flag of said cache entry is set to a value when said layout is carried out, said value allowing said data object to be preferentially discarded, and (ii) a cacheable space in which a data object stored therein is to be laid out in one of the cache entries in the cache memory and in which the weak flag of said cache entry is not set to a value when said layout is carried out, said value allowing said data object to be preferentially discarded, the directive obtainment unit obtains (i) a directive that a specific data object in the source program should be stored into the weak space or the cacheable space depending on layout information that indicates whether said specific data object should be laid out in the weak space or the cacheable space, (ii) a name of said specific data object, and (iii) said layout information, and the optimization unit causes the specific data object specified by said name to be laid in either the weak space or the cacheable space according to the layout information.

By laying data objects in appropriate spaces, e.g. in a weak space, it becomes possible to set a weak bit to a less frequently-used data object so as to discard such data object preferentially from the cache memory. Accordingly, it becomes possible to prevent the occurrence of cache miss that is caused by conflicts in which data objects contend for a block with the same set number on the cache memory and try to flush other data objects.

More preferably, the directive obtainment unit obtains, from the source program, a directive for causing a cache memory control unit operable to control the cache memory to execute a dedicated command that is dedicated to said cache memory control unit, and the optimization unit causes the cache memory control unit to execute said dedicated command according to the directive.

By making it possible to specify a dedicated command to be executed by the cache memory control unit, it becomes possible for the user to specify a detailed control of the cache memory. Accordingly, it becomes possible to prevent the occurrence of cache miss on the cache memory.

Note that not only is it possible to embody the present invention as a compiler apparatus with the above characteristic units, but also as a compilation method that includes, as its steps, the characteristic units equipped to the above compiler apparatus, and as a program that causes a computer to function as each of the units included in the above compiler apparatus. It should be also noted that such program can be distributed on a recording medium such as Compact Disc-Read Only Memory (CD-ROM) and over a transmission medium such as the Internet.

According to the present invention, it is possible to achieve the following effects:

a fewer man-hours are required than in the case of developing programs by use of assembly language;

the asset value of programs are improved;

there is no need to carry out performance tuning by human hands;

it is possible to prevent the occurrence of cache miss caused by the fact that data objects cannot be loaded into the cache memory at one time;

it becomes possible to prevent the occurrence of cache miss caused by the fact that a data object to be used is not present in the cache memory at program execution time; and it becomes possible to prevent the occurrence of cache miss that is caused by conflicts in which data objects contend for a block with the same set number on the cache memory and try to flush other data objects.

The disclosure of Japanese Patent Application No. 2003-357323 filed on Oct. 17, 2003 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIGS. 8A-8C are diagrams for explaining tiling processing;

FIGS. 9A and 9B are diagrams for explaining processing for checking the occurrence of capacity miss;

FIGS. 10A-11B are diagrams for explaining specifications of prefetch instruction insertion processes;

FIGS. 13A-13G are diagrams for explaining a method for specifying a prefetch instruction insertion process by use of profile information;

FIGS. 15A-15D are diagrams for explaining a method for specifying how data items are laid out;

FIG. 16 is a diagram showing an exemplary source program that includes a pragma directive for specifying data layout;

FIG. 17 is a diagram showing objects placed into groups;

FIG. 18 is a diagram showing an exemplary source program that includes a pragma directive for specifying data layout;

FIGS. 19A-19C are diagrams showing a method for specifying spaces where objects are to be stored;

FIGS. 21A-21H are diagrams showing built-in functions;

FIG. 22 is a diagram showing exemplary intermediate codes generated by a cache command insertion unit;

FIGS. 23A-23H are diagrams showing built-in functions for checking whether the built-in functions shown in FIGS. 21A-21H are operating effectively or not; and FIGS. 24A-24E are diagrams for explaining a method for specifying a variety of information to be inputted/outputted to and from the compiler.

DESCRIPTION OF THE PREFERRED EMBODIMENT

Figure 1:
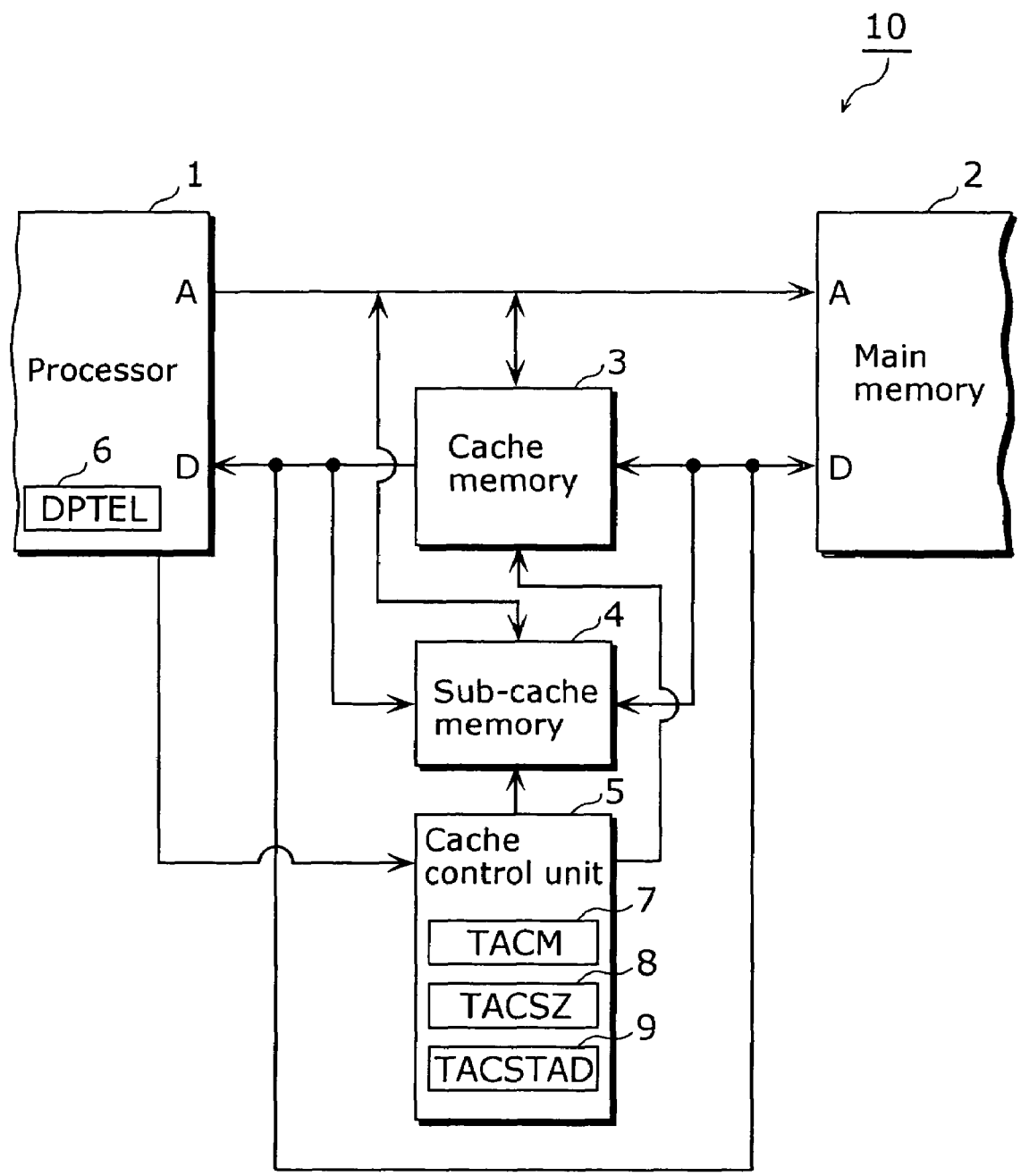
FIG. 1 is a block diagram showing a partial hardware construction of a target computer of a compilation system according to a preferred embodiment of the present invention.

FIG. 1 is a block diagram showing a partial hardware construction of a target computer of a compilation system according to the preferred embodiment of the present invention. A computer 10 is comprised of a processor 1, a main memory 2, a cache memory 3, a sub-cache memory 4, and a cache control unit 5. The processor 1, which is a processing unit that executes a machine language program, has a dedicated register 6 (dedicated register DPTEL) to be described later, in addition to the functionality of ordinary processors.

The main memory 2 is a memory that stores machine language instructions to be executed by the processor 1 as well as a variety of data.

The cache memory 3 is a memory that operates in accordance with a 4-way set associative scheme, and that is capable of performing data reading and writing at a higher speed than the main memory 2. Note that the storage capacity of the cache memory 3 is smaller than that of the main memory 2.

The sub-cache memory 4 is a memory that operates in accordance with a direct mapping scheme, and that is capable of performing data reading and writing at a higher speed than the main memory 2. Note that the storage capacity of the sub-cache memory 4 is smaller than that of the cache memory 3.

The cache control unit 5, which is a processing unit for controlling the cache memory 3 and the sub-cache memory 4, has dedicated registers 7-9 (dedicated registers TACM, TACSZ, and TACSTAD) to be described later.

Figure 2:
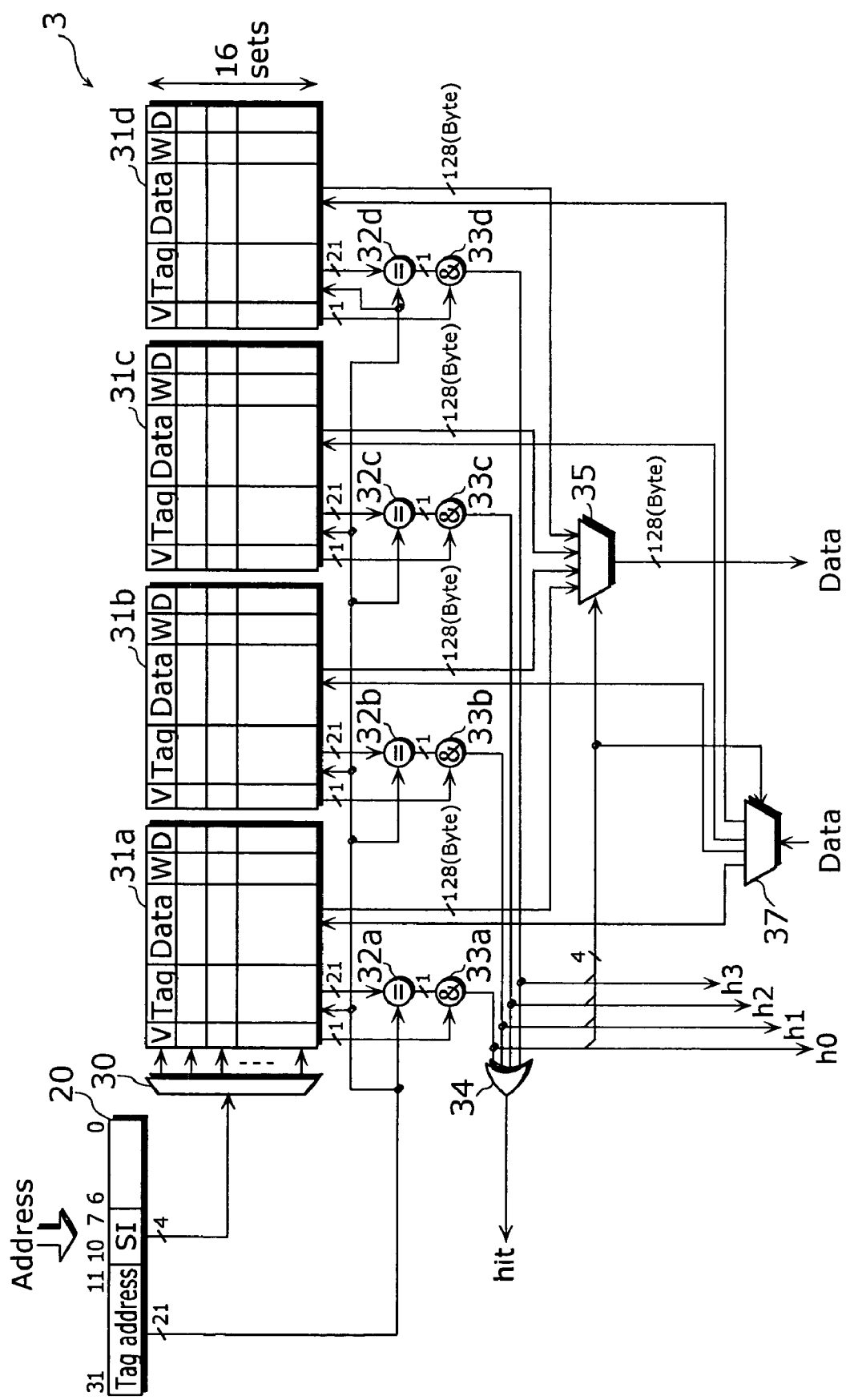
FIG. 2 is a block diagram showing a hardware construction of a cache memory.

FIG. 2 is a block diagram showing a hardware construction of the cache memory 3. As shown in this drawing, the cache memory 3 is a 4-way set associative cache memory that is equipped with an address register 20, a decoder 30, four ways 31$a$-31$d$ (hereinafter abbreviated as ways 0-3), four comparators 32$a$-32$d$, four AND circuits 33$a$-33$d$, an OR circuit 34, a selector 35, and a demultiplexer 37.

The address register 20 is a register that holds an access address that is used to make an access to the main memory 2. This access address shall be 32 bits. As shown in FIG. 2, an access address includes the following elements in order starting with the most significant bit: a 21-bit tag address; and a 4-bit set index (indicated as "SI" in the drawing). Here, the tag address indicates a location on the main memory to be mapped to ways. The set index (SI) indicates one of the plural sets stored over the ways 0-3. The number of sets is 16 sets since the set index (SI) is 4 bits. A block specified by the tag address and the set index (SI) serves as a unit of replacement. A block is called "line data", "line" or "cache entry" when stored in the cache memory. The size of line data is 128 (=$2^7$) bytes, which is determined by the address bits (7 bits) that are the next lower bits of the least significant bit of the set index (SI). Assuming that one word is 4 bytes, one line data is made up of 32 (=128/4) words. The 7 bits starting from the least significant bit in the address register 20 is ignored when an access is made to a way.

The decoder 30 decodes the 4 bits of the set index (SI), and selects one of the 16 sets stored over the four ways 0-3.

The four ways 0-3 have the same construction as one another, and have a total storage capacity of 4×2 k bytes. The way 0 has 16 cache entries.

Figure 3:
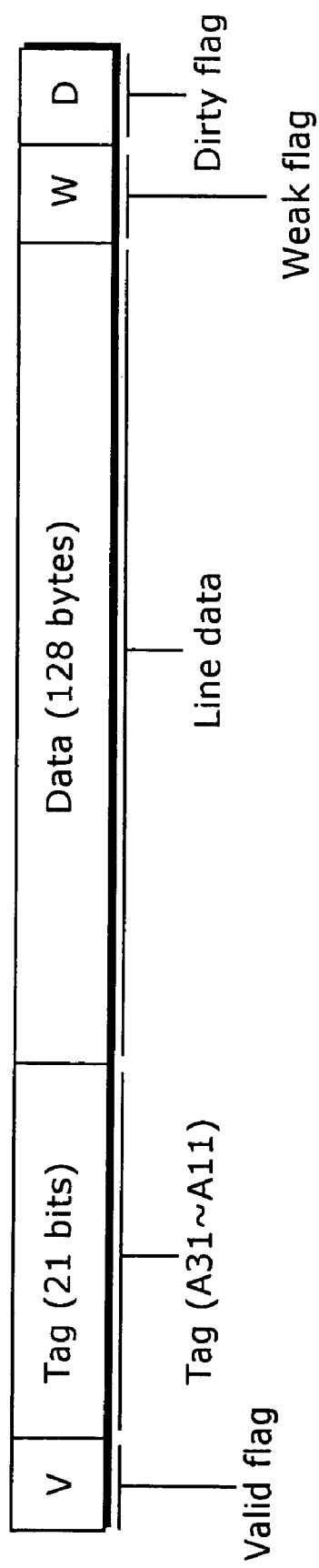
FIG. 3 is a diagram showing a detailed bit structure of one cache entry.

FIG. 3 is a diagram showing a detailed bit structure of one cache entry. As shown in this drawing, one cache entry includes a valid flag V, a 21-bit tag, 128-byte line data, a weak flag W, and a dirty flag D. The valid flag V indicates whether the cache entry is valid or not. The tag is a copy of a 21-bit tag address. The line data is a copy of 128-byte data included in a block specified by the tag address and the set index (SI). The dirty flag D indicates whether writing has been performed to the cache memory or not, i.e. whether or not it is necessary for data that has been cached to the cache entry to be written back to the main memory 2 since it is now different from data stored in the main memory 2 because of the fact that the writing has been performed. The weak flag W is a flag that indicates a cache entry whose data should be discarded. When a cache miss occurs in the cache memory 3, data in a cache entry whose weak flag W is 1 is preferentially discarded.

The ways 1-3 also have the same construction as that of the way 0. Four cache entries that are stored over the four ways and that are selected via the decoder 30 according to the four bits of the set index (SI), are called a "set".

The comparator 32$a$ compares the tag address in the address register 20 with the tag of the way 0 out of four tags included in the set that has been selected according to the set index (SI), to see if they match or not. The comparator 32$b$-32$d$ perform the same processing for their corresponding ways 1-3, respectively.

The AND circuit 33$a$ compares the valid flag V with the comparison result of the comparator 32$a$ to see if they match or not. Suppose that this comparison result of the AND circuit 33$a$ is h0. When the comparison result h0 is 1, it means that there exists line data corresponding to the tag address in the address register 20 and to the set index (SI), i.e. there is a cache hit in the way 0. When the comparison result h0 is 0, it means that a cache miss has occurred in the way 0. The AND circuits 33$b$-33$d$ perform the same processing for their corresponding ways 1-3, respectively. Their comparison results h1-h3 indicate whether there is a cache hit or a cache miss in the respective ways 1-3.

The OR circuit 34 carries out the logical OR among comparison results h0-h3. Suppose that this logical OR is "hit". "hit" indicates whether it was a cache hit or not in the cache memory 3.

The selector 35 selects, from among pieces of line data in the ways 0-3 in the selected set, line data in the way where a cache hit has occurred.

The demultiplexer 37 outputs write data to one of the ways 0-3, when writing data to the cache entry.

Figure 4:
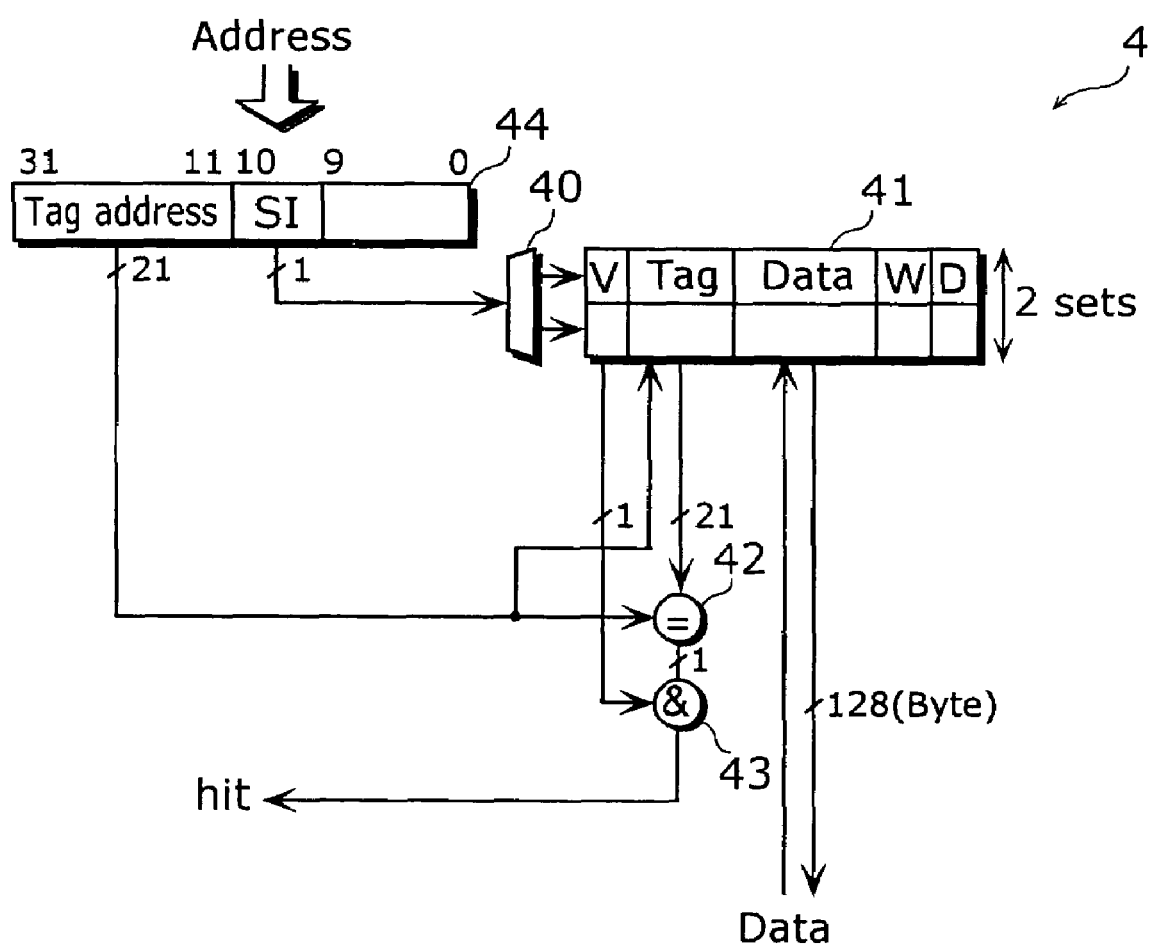
FIG. 4 is a block diagram showing a hardware construction of a sub-cache memory.

FIG. 4 is a block diagram showing a hardware construction of the sub-cache memory 4. As shown in this drawing, the sub-cache memory 4 is a cache memory employing a direct mapping scheme (1-way set associative scheme) that is equipped with an address register 44, a decoder 40, a way 41, a comparator 42, and an AND circuit 43.

The address register 44 is a register that holds an access address that is used to make an access to the main memory 2. This access address shall be 32 bits. As shown in FIG. 4, an access address includes the following elements in order starting with the most significant bit: a 21-bit tag address; and a 1-bit set index (indicated as "SI" in the drawing). Here, the tag address indicates a location on the main memory to be mapped to the way. The number of sets in the way 41 is two since the set index (SI) is one bit. A block specified by the tag address and the set index (SI) serves as a unit of replacement. A block is called "line data", "line" or "cache entry" when stored in the cache memory. The size of line data is 128 bytes. Assuming that one word is 4 bytes, one line data is made up of 32 (=128/4) words. The 10 bits starting from the least significant bit in the address register 44 is ignored when an access is made to the way 41.

The decoder 40 decodes the 1 bit of the set index (SI), and selects one of the two sets. The structure of a cache entry is as shown in FIG. 3.

The comparator 42 compares the tag address in the address register 44 with the tag included in the set selected according to the set index (SI) to see if they match or not.

The AND circuit 43 compares the valid flag V with the comparison result of the comparator 42 to see if they match or not. Suppose that this comparison result of the AND circuit 43 is "hit". When the comparison result "hit" is 1, it means that there exists line data corresponding to the tag address in the address register 44 and to the set index (SI), i.e. a cache hit has occurred. When the comparison result "hit" is 0, it means that a cache miss has occurred.

Figure 5:
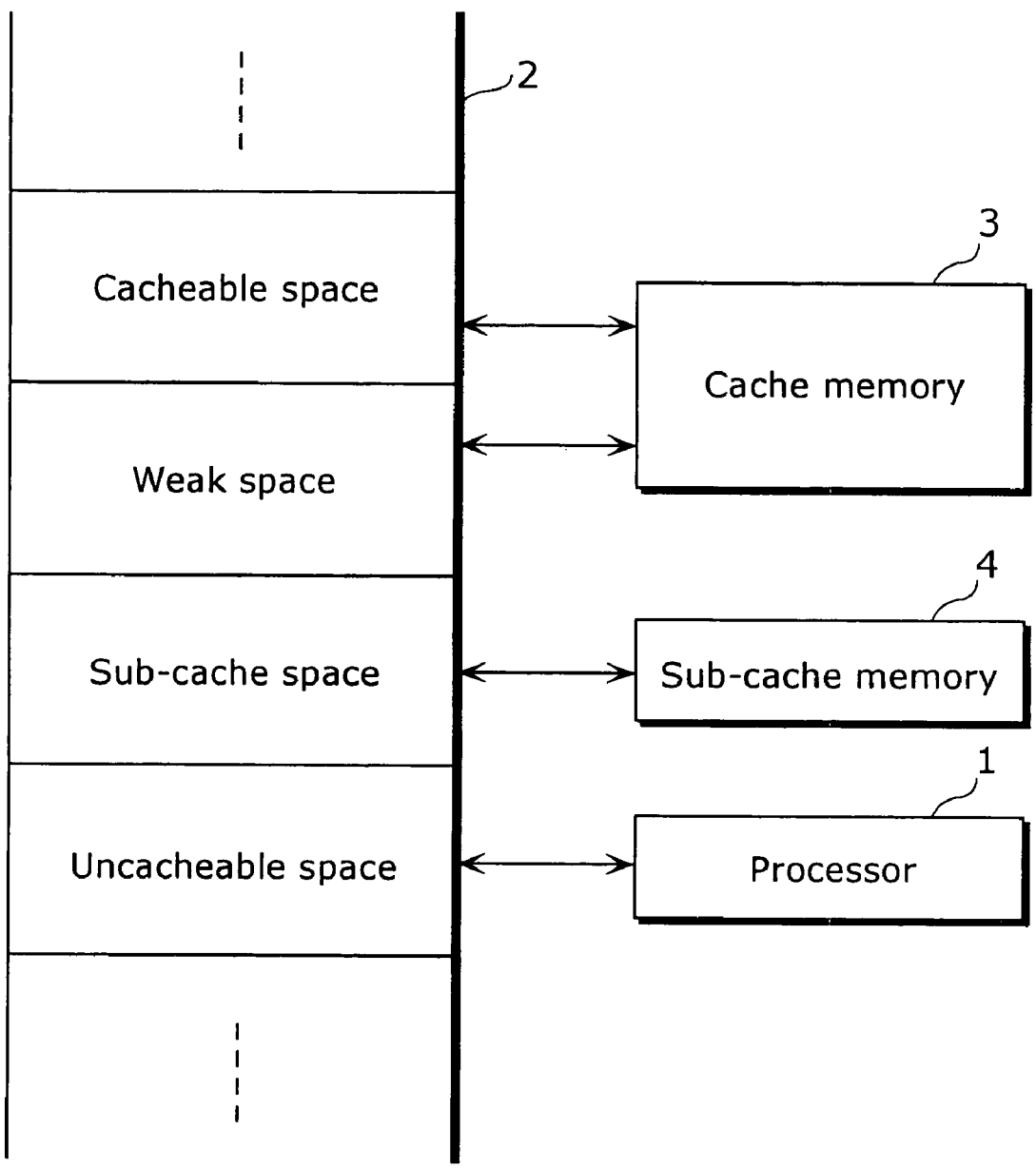
FIG. 5 is a diagram for explaining types of memory locations included in a main memory.

FIG. 5 is a diagram for explaining types of memory locations on the main memory 2. Such memory locations are categorized into four types: cacheable space; weak space; sub-cache space; and uncacheable space. Instructions or data laid in a cacheable space or a weak space are read/written from and to the cache memory 3. Of them, 1 is set as the weak bit W of data in the weak space when it is laid in the cache memory 3. Instructions or data laid in a sub-cache space are read/written from and to the sub-cache memory 4. Meanwhile, instructions or data laid in an uncacheable space are directly exchanged with the processor 1, without being laid in the cache memory 3 or the sub-cache memory 4.

Figure 6:
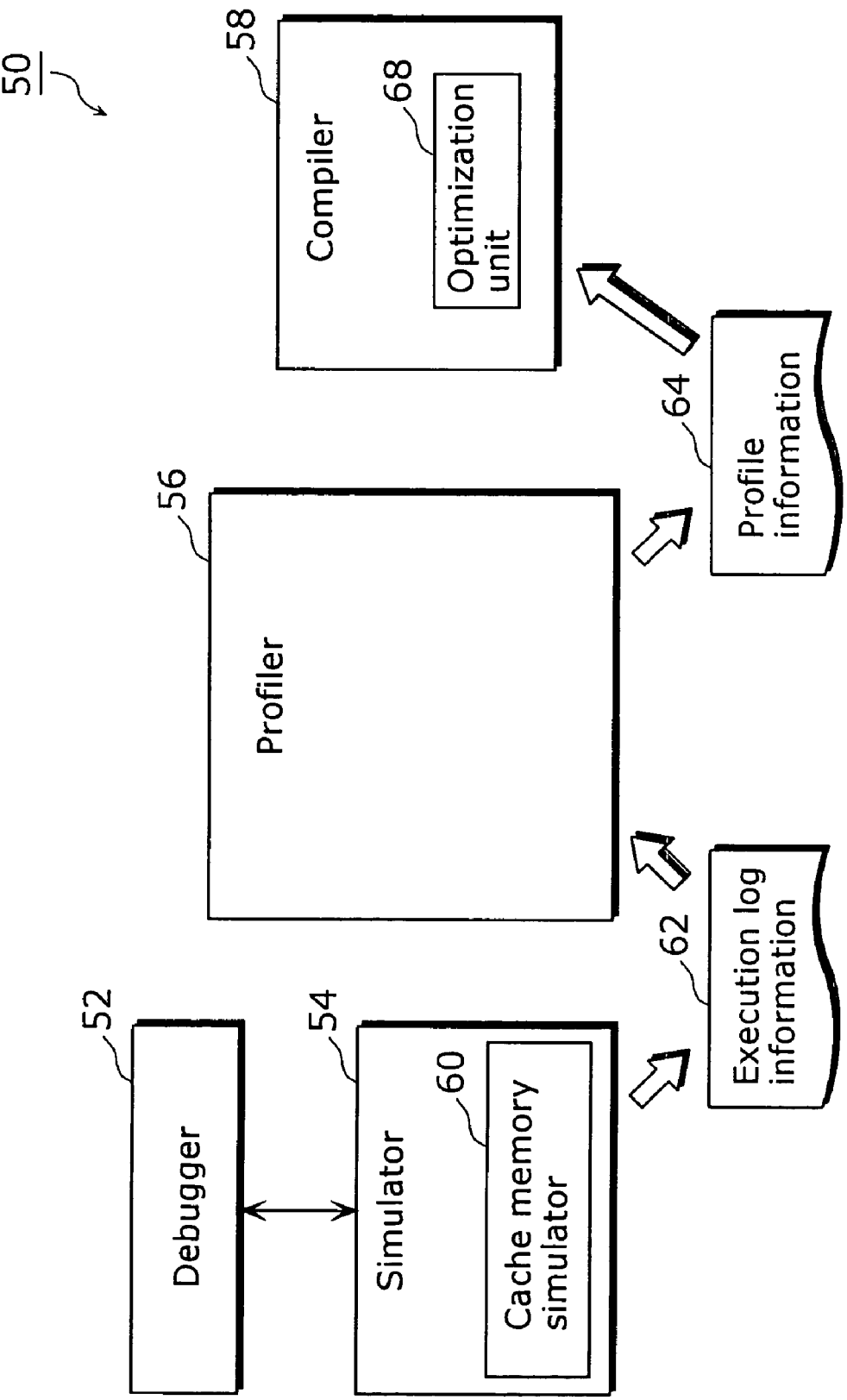
FIG. 6 is a block diagram showing a construction of a program development system for developing a machine language program.

FIG. 6 is a block diagram showing a program development system 50 for developing a machine language program to be executed by the processor 1 in the computer 10. This program development system 50 is formed of a debugger 52, a simulator 54, a profiler 56, and a compiler 58.

The compiler 58, which is a program for reading in a source program and profile information 64 that is outputted from the profiler 56 and converting the source program into a machine language program, is internally equipped with an optimization unit 68 that optimizes machine language instructions. A detailed description of the compiler 58 is given later.

The debugger 52 is a program for identifying locations as well as causes of bugs that are discovered when the source program is compiled by the compiler 58. The simulator 54 is a program that virtually executes a machine language program, whose execution result is outputted as execution log information 62. Note that the simulator 54 is internally equipped with a cache memory simulator 60 that outputs, as part of the execution log information 62, simulation results of the cache memory 3 and the sub-cache memory 4 such as cache hit and cache miss.

The profiler 56 is a program for analyzing the execution log information 62 and outputting the profile information 64 that serves as hint information for the compiler 58 in performing optimization and the like.

Figure 7:
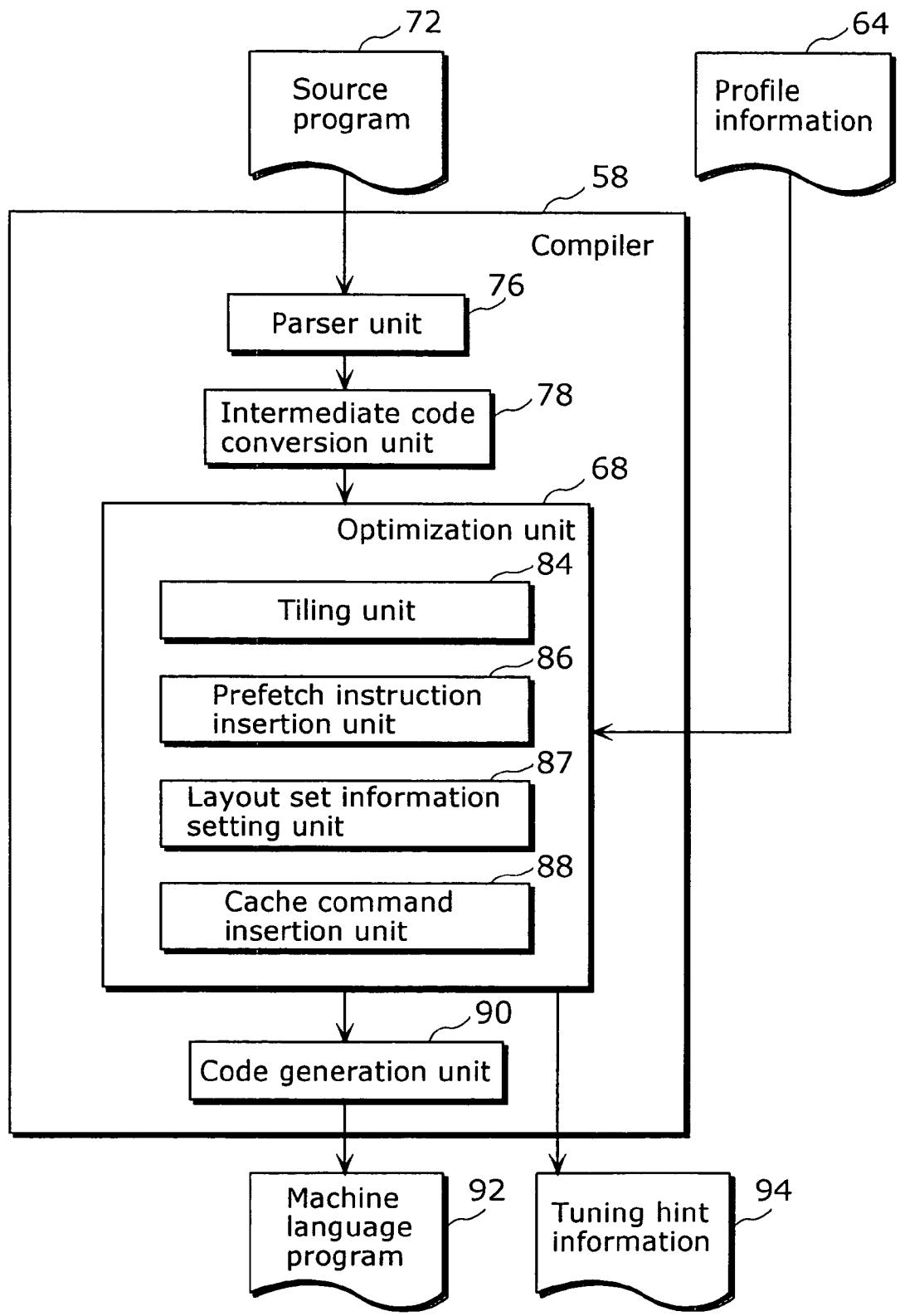
FIG. 7 is a functional block diagram showing a construction of a compiler.

FIG. 7 is a functional block diagram showing a construction of the compiler 58. This compiler 58 is a cross-compiler that converts a source program 72 written in high-level language such as the C language and the C++ language into a machine language program 92 that is targeted at the above processor 1. The compiler 58, which is implemented as a program to be executed by a computer such as personal computer, includes a parser unit 76, an intermediate code conversion unit 78, an optimization unit 68, and a code generation unit 90 as its major components.

The parser unit 76 is a pre-processing unit that extracts a reserved word (keyword) and the like from the source program 72 to be compiled and performs lexical analysis of the extracted word.

The intermediate code conversion unit 78 is a processing unit that converts each statement in the source program 72 passed from the parser unit 72 into an intermediate code in accordance with a certain rule. Here, intermediate code is a code that is typically represented in function call form (e.g. a code represented as "+(int a, int b) indicating that "integer b is added to integer a"). However, intermediate codes include not only codes in function call form but also machine language instructions of the processor 1. The intermediate code conversion unit 78 generates optimum intermediate codes with reference to the profile information 64, when generating such intermediate codes.

The optimization unit 68 is a processing unit that increases execution speed as well as reducing the sizes of codes through instruction linkage, redundancy removal, instruction reordering, register allocation and others on the basis of intermediate codes outputted from the intermediate code conversion unit 78. In addition to the ordinary optimization functionality, this optimization unit 86 is equipped with the following processing units for performing optimization processing that is unique to the present compiler 58: a tiling unit 84; a prefetch instruction insertion unit 86; a layout set information setting unit 87; and a cache command insertion unit 88. Detailed descriptions of processing performed by the tiling unit 84, the prefetch instruction insertion unit 86, the layout set information setting unit 87, and the cache command insertion unit 88 are given later. Note that the optimization unit 68 also outputs tuning hint information 94 that serves as a hint for the user when s/he re-creates the source program 72, such as information related to cache miss in the cache memory 3.

The code generation unit 90 generates a machine language program 92 by converting all the intermediate codes outputted from the optimization unit 68 into machine language instructions, with reference to an internally stored conversion table, and the like.

The compiler 58 is particularly intended for reducing the number of cache misses on the cache memory 3. Cache miss is roughly categorized into (1) initial miss, (2) capacity miss, and (3) conflict miss. "Initial miss" occurs when an object that is desired to be used at program execution time is not present in the cache memory 3. "Capacity miss" occurs when an attempt is made to process a large number of objects at one time, as a result of which such objects cannot be loaded into the cache memory 3 at one time. "Conflict miss" is caused by the fact that plural objects contend for the same cache entry on the cache memory 3, trying to flush each other from such cache entry.

Next, providing concrete examples, descriptions are given of the characteristic operations performed by the compiler 58 with the above construction.

(1) Tiling Processing

Tiling processing is a technique to be used when a capacity miss is occurring in order to minimize the volume of objects to be processed at one time to the capacity that is equal to or smaller than that of the cache memory 3, by partitioning one loop into plural loops. This tiling processing is performed by the tiling unit 84.

Figure 8C:
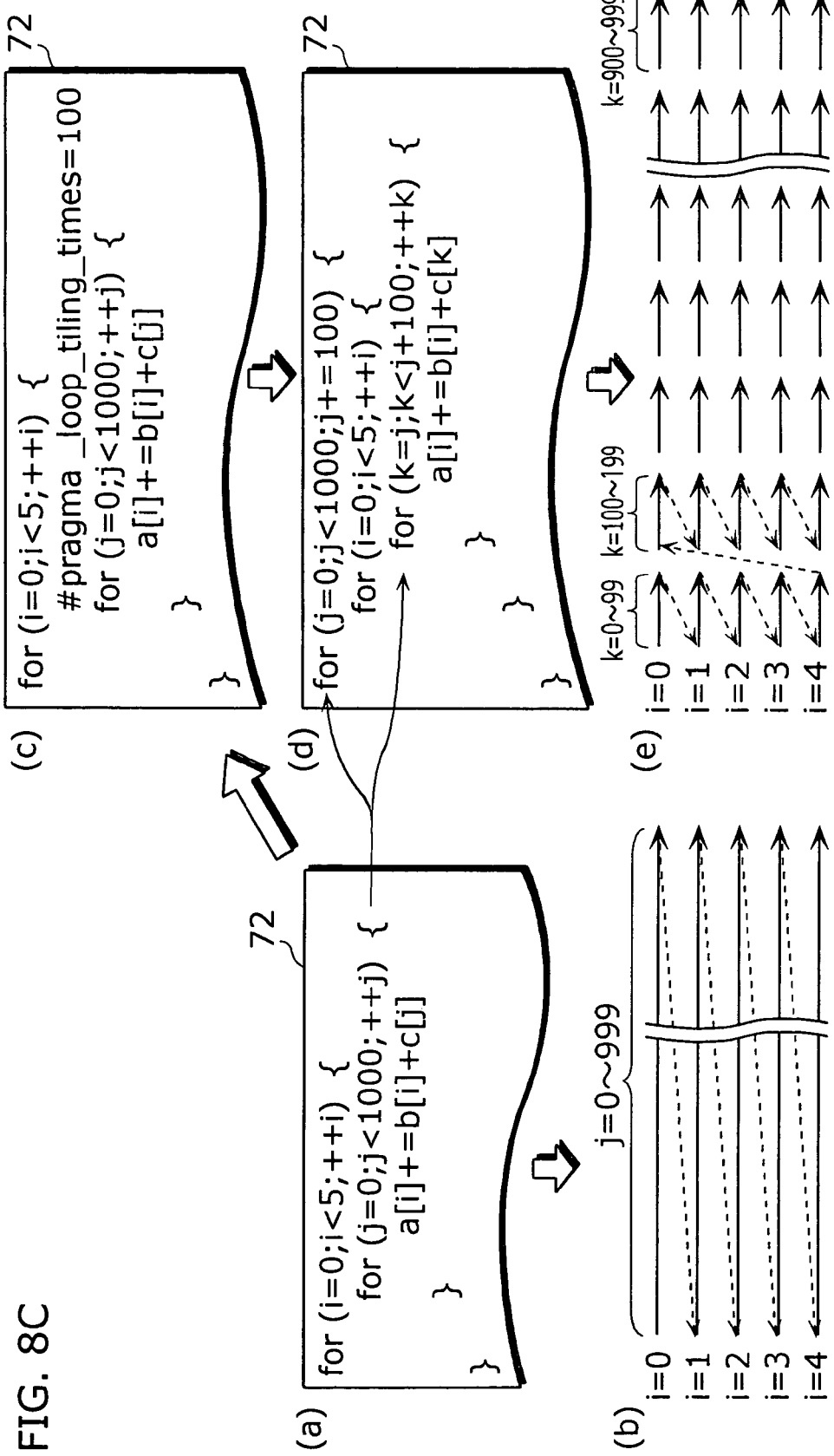

FIGS. 8A-8C are diagrams for explaining tiling processing.

FIGS. 8A and 8B are diagrams showing exemplary pragmas for specifying the executions of tiling processing. Note that "pragma (or pragma directive)" is a directive to the compiler 58 that is a character string starting with "#pragma" and that can be arbitrarily specified (placed) by the user within the source program 72.

The pragma directive shown in FIG. 8A specifies the execution of such tiling processing as allows the volume of objects used in the loop process to be a constant size (volume in bytes specified by "NUM"). Note that when the volume NUM is not specified, the execution of tiling processing that allows the volume to be a predetermined (default) size is specified.

The pragma directive shown in FIG. 8B specifies the execution of such tiling processing as allows the number of loops in the loop process to be a constant number (the value specified by "NUM"). Note that when the number NUM is not specified, the execution of tiling processing is specified that allows the number of loops to be a predetermined (default) number.

Note that in the above-described pragma directives, a loop process that is described immediately following the pragma directives is to be processed.

(a) in FIG. 8C shows an exemplary loop process that does not include any pragma directives. (b) in FIG. 8 schematically shows variations in the value of the loop counter in this loop process. In this loop process, as shown in (b) in FIG. 8C, the loop counter j is incremented by 1 in the range from 0 to 999, every time the loop counter i is incremented by 1. Therefore, when the object "c" is laid in a cacheable space or a weak space on the main memory 2, a capacity miss occurs as a result of attempting to lay the object "c" (1000 array elements) at one time on the cache memory 3.

As shown in (c) in FIG. 8C, therefore, by inserting a pragma directive "#pragma_loop_tiling_times=100" into immediately before the second loop process in the source program 72, the source program 72 shown in (a) in FIG. 8C is converted into the source program 72 shown in (d) in FIG. 8C. Stated another way, processing for incrementing the value of the loop counter j by 1 for 1000 times in the range from 0 to 999 is converted into processing for executing a loop iteration 10 times for incrementing the value of the loop counter k 100 times. Accordingly, it becomes possible to reduce the number of objects to be laid at one time on the cache memory 3 to 100 elements of the array "c", and therefore to prevent the occurrence of capacity misses. Note that since tiling processing is performed by the tiling unit 84 as described above, the conversion from the source program 72 shown in (c) in FIG. 8C into the source program 72 shown in (d) in FIG. 8C is carried out in practice in the form of intermediate codes.

Note that even when there is a change in the hardware construction such as the capacity of the cache memory 3, the use of pragma directives makes it possible to respond to such change simply by changing the values of the volume NUM and the number NUM and then by carrying out recompilation. Accordingly, it becomes possible to improve the asset value of a source program.

Note that the tiling unit 84 may also be configured to check if any capacity miss is occurring or not. FIGS. 9A and 9B are diagrams for explaining processing for checking the occurrence of capacity miss. By defining a pragma for outputting, as tuning hint information 94, information indicating whether there is any capacity miss or not as shown in FIG. 9A, for example, and then by describing such pragma immediately before the loop to be checked in the source program 72, such information indicating whether any capacity miss is occurring or not in the specified loop is outputted as the tuning hint information 94.

(a) in FIG. 9B shows an example of the source program 72 that includes loop processes, whereas (b) in FIG. 9B shows an example of the source program 72 in which the pragma directive shown in FIG. 9A is inserted into immediately before the respective loops included in the source program 72 shown in (a) in FIG. 9B. As shown in (c) in FIG. 9B, by compiling the source program shown in (b) in FIG. 9B, information indicating whether there is any capacity miss or not in these two loop processes is outputted as the tuning hint information 94. Accordingly, the user can know whether there is any capacity miss or not by referring to such outputted tuning hint information 94. Also, by inserting the pragma directive shown in FIG. 8A or FIG. 8B into the source program 72, it becomes possible to cause tiling processing to be performed, and therefore to prevent the occurrence of capacity misses.

Note that it is possible to specify the pragma directive shown in FIG. 8A or FIG. 8B and the pragma directive shown in FIG. 9A at the same time for the same loop.

Also note that it is possible to configure the present invention to automatically execute tiling processing so as not to cause any capacity misses, in addition to the construction in which the tiling unit 84 is caused to check whether there is any capacity misses or not by inserting the pragma directive shown in FIG. 9A into immediately before a loop.

(2) Prefetch Instruction Insertion Process

Prefetch instruction insertion process refers to processing for inserting, into an intermediate code, an instruction for previously prefetching, to the cache memory 3, an object stored in a designated location on the main memory 2. This prefetch instruction insertion process is performed by the prefetch instruction insertion unit 86.

FIGS. 10A-11B are diagrams for explaining a method for specifying prefetch instruction insertion processes. FIGS. 10A-10D illustrate how prefetch instruction insertion processes are specified for specific variables.

FIGS. 10A and 10B show specifications of prefetch instruction insertion processes by use of pragma directives, where each of such specifications is intended for inserting an instruction for previously prefetching the value of a specified variable name to the cache memory 3. Note that in the case where the number of cycles is specified as shown in FIG. 10B, a prefetch instruction is inserted at a point that is said number of cycles before the specified variable is referred to. In the case where the number of cycles is not specified as shown in FIG. 10A, a prefetch instruction is inserted at a point that is a predetermined number of cycles (default cycles) before the specified variable is referred to. In other words, as shown in FIG. 10E, for example, a prefetch instruction for prefetching the variable "a" a specified number of cycles or a default number of cycles before an access is actually made to such variable "a", is inserted.

FIGS. 10C and 10D show specifications of prefetch instruction insertion processes by use of built-in functions. Each of the built-in functions shown in FIGS. 10C and 10D includes an address and a size as arguments. Each of these built-in functions directs that an instruction should be inserted that is intended for previously prefetching, to the cache memory 3, the value in a location on the main memory 2 whose start address is the above address and that is specified by the above size. Note that when the number of cycles is specified as shown in FIG. 10D, processing equivalent to the one as in the case of the pragma directive shown in FIG. 10B is carried out, whereas when the number of cycles is not specified as shown in FIG. 10C, processing equivalent to the one as in the case of the pragma directive shown in FIG. 10A is carried out.

FIGS. 11A and 11B show how prefetch instruction insertion processes are specified for arrays in loops by use of pragma directives. Loop processes that are described immediately following the respective pragma directives are to be processed. When the number of cycles is specified as shown in FIG. 11B, an instruction is inserted that allows an array element to be prefetched a specified number of cycles before such array element is actually referred to. On the other hand, when the number of cycles is not specified as shown in FIG. 11A, an instruction is inserted that allows said element to be prefetched at a point that is a default number of cycles before.

Figure 12:
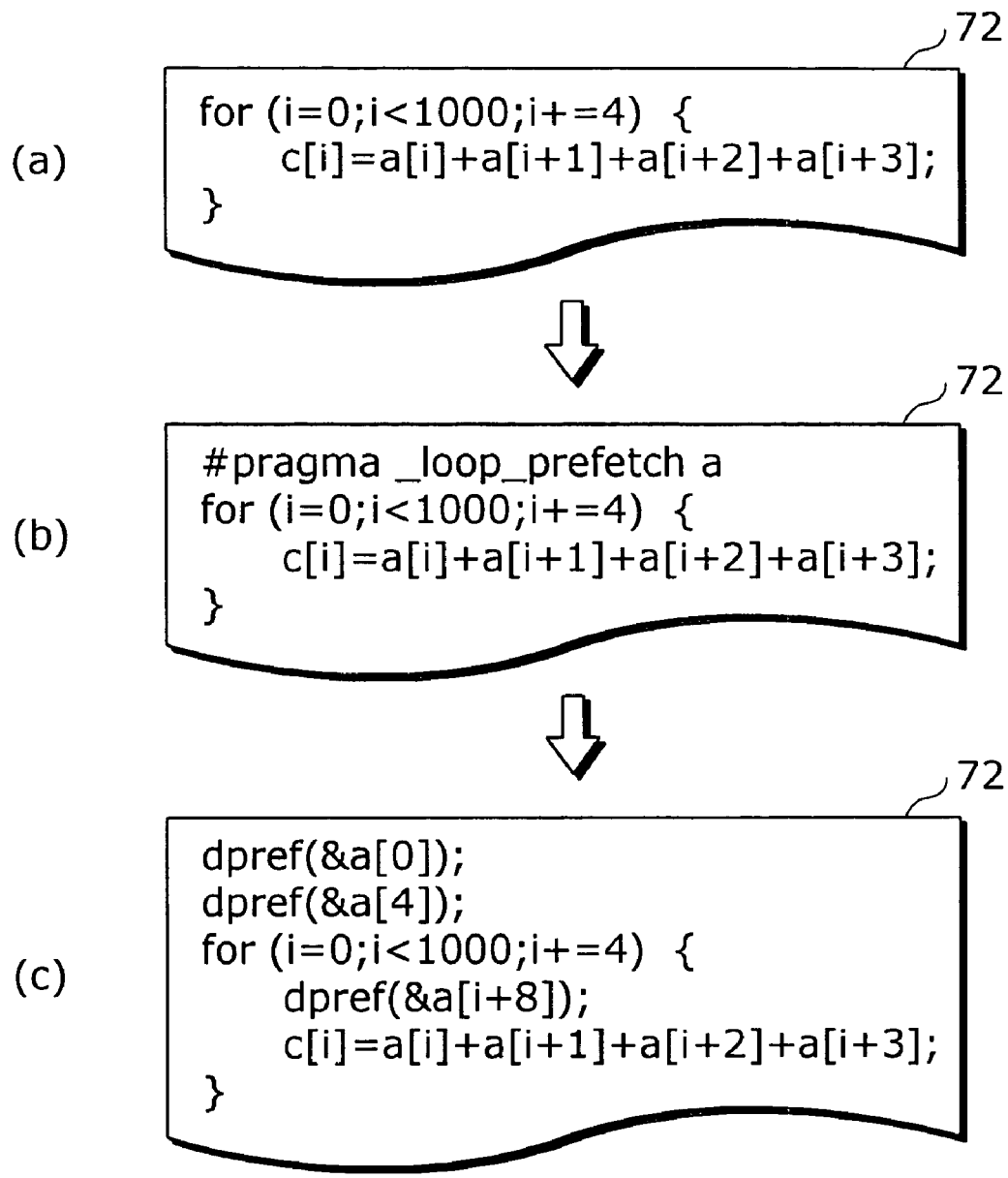
FIG. 12 is a diagram for explaining a prefetch instruction insertion process to be performed for an array in a loop by use of pragma directive.

FIG. 12 is a diagram for explaining a prefetch instruction insertion process to be performed for an array in a loop by use of pragma directive. In the case where a pragma for prefetching the array "a" is described, as shown in (b) in FIG. 12, in a loop process in the source program 72 as shown in (a) in FIG. 12, a prefetch instruction insertion command dpref( ) is inserted as shown in (c) in FIG. 12. By executing "dpref (&a [0])" and "dpref (&a [4])", the values of the array a[0] to a[7] that are referred to when the value of the loop counter i satisfies i=0 and i=1, are prefetched to the cache memory 4. Subsequently, the loop process is started, and by executing "dpref (&a [i+8])", array elements that are used two cycles later are prefetched to the cache memory 3. As described above, elements are prefetched over the loop iterations. More specifically, array elements are prefetched on an iteration that is performed ahead of the one on which such elements are referred to. Note that the prefetch instruction insertion unit 86 inserts, in practice, a prefetch instruction to intermediate codes.

Thus, it is possible to prevent the occurrence of initial misses by executing prefetch instruction insertion processes as described above.

Note that a prefetch instruction may be automatically inserted by use of the profile information 64. FIGS. 13A-13G are diagrams for explaining a method for specifying prefetch instruction insertion processes by use of the profile information 64.

FIG. 13A illustrates a method for specifying a prefetch instruction insertion process by means of compilation option. When this option is set at compilation time, an object that is causing an initial miss is examined based on the profile information 64, and an instruction for prefetching such object is inserted. Note that it is also possible to specify, through this compilation option, the number of cycles corresponding to the timing at which a prefetch instruction should be inserted, as in the case of the above specification method.

FIGS. 13B-13D illustrate a method for specifying a prefetch instruction insertion process by means of pragma. As FIG. 13E shows, a pragma shown in FIG. 13B and a pragma shown in FIG. 13C are used in a pair, and a prefetch instruction is inserted in an area that is delimited by "#pragma_prof_insert_dpref on" and "#pragma_prof_insert_dpref off".

When the pragma shown in FIG. 13D is specified in the source program 72, it indicates that the subsequent instructions should be executed in accordance with compilation option. More specifically, in the case where a compilation option shown in FIG. 13A is set, a prefetch instruction is inserted based on the profile information 64, in accordance with such option, whereas in the case where no compilation option is set, a prefetch instruction is not inserted. Note that pragmas shown in FIGS. 13B-13D may be described in the source program 72 as built-in functions.

FIGS. 13F and 13G illustrate a method for specifying a prefetch instruction insertion process by means of built-in function. Each of the built-in functions shown in FIGS. 13F and 13G includes an address and a size as arguments. Each of these built-in functions directs that an instruction should be inserted that is intended for previously prefetching, to the cache memory 3, the value in a location on the main memory 2 whose start address is the above address and that is specified by the above size, in the case where an initial miss occurs in such location. Note that as shown in FIG. 13G, it is also possible to specify the number of cycles corresponding to the timing at which a prefetch instruction is to be inserted, as in the case of the above specification methods. Such specification may be implemented as a pragma directive.

As described above, by inserting a prefetch instruction, it becomes possible to prevent initial miss related to a specified object, in consideration of latency in the cache memory 3. In particular, in the processing for inserting a prefetch instruction in consideration of the profile information 64, in the case where there does not exist any other instructions before an access is made to a variable to be prefetched, for example, it is impossible to insert such prefetch instruction after an interval of a specified number of cycles or a default number of cycles. Therefore, the insertion of such instruction is not to be carried out, since it is useless to insert a prefetch instruction in such case. Moreover, since there is no need to prefetch objects that are already present in the cache memory 3, no insertion of prefetch instruction is performed in such case too. A determination of whether to perform no insertion or to perform prefetch is made by reference to the profile information 64.

(3) Data Layout Specification Processing

Figure 14:
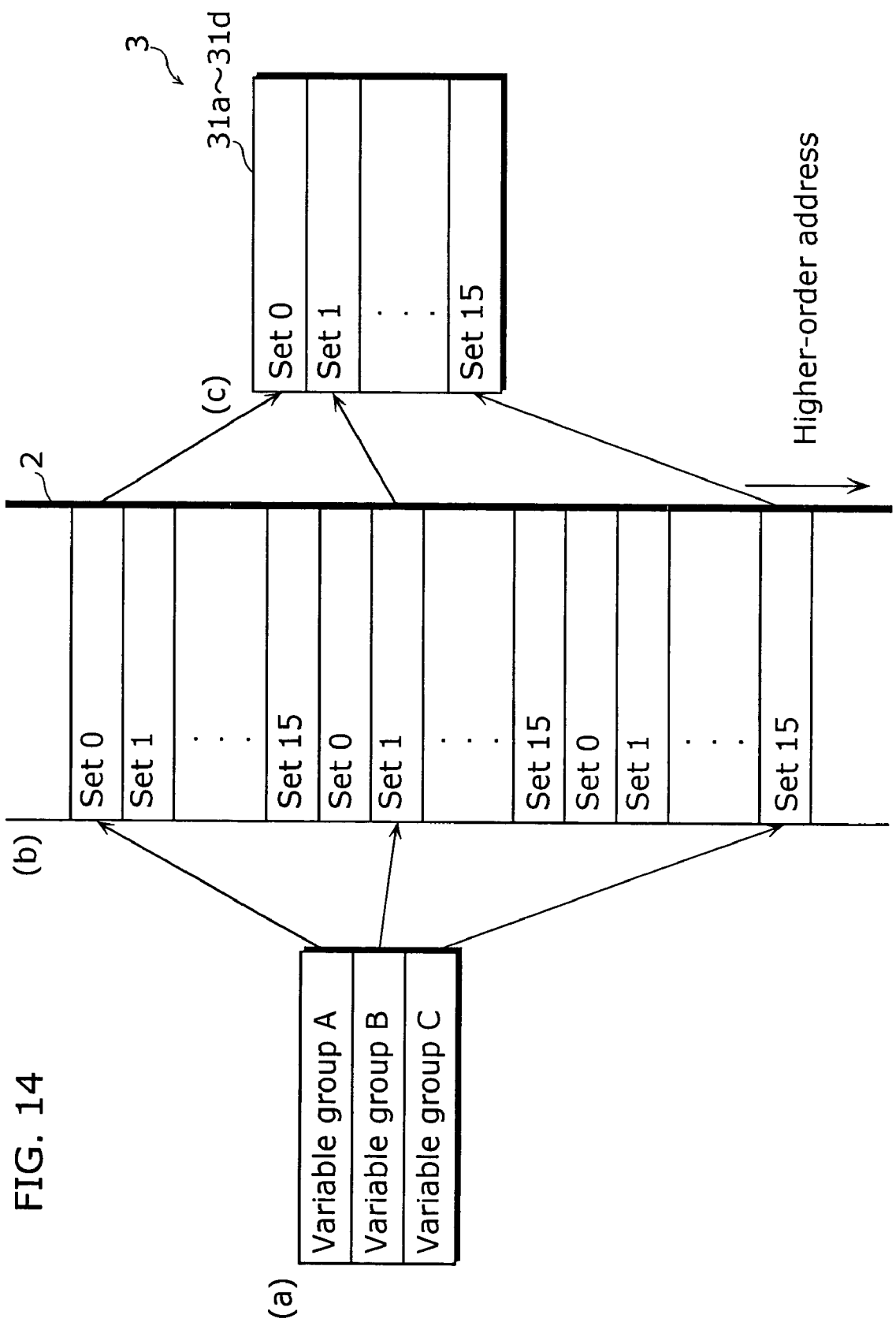
FIG. 14 is a diagram for explaining an overview of data layout processing.

FIG. 14 is a diagram for explaining an overview of data layout processing. Suppose, as shown in (a) in FIG. 14, that some of the variables included in the source program form three variable groups (variable groups A-C) to which accesses are made at similar timings (e.g. variables whose lifetimes overlap). The size of data included in each variable group shall be 128 bytes, which is the size of line data in the cache memory 3. In the compilation system, machine language instructions are generated that allow these three variable groups to be written to blocks with different set numbers when they are written to the cache memory 3. For example, as shown in (b) in FIG. 14, assuming that the variable groups A, B, and C are respectively laid out in blocks corresponding to sets 0, 1, and 15 on the cache memory 3, the variable groups A, B, and C are to be stored into storage locations on the main memory 2 that allow them to be written to the blocks corresponding to the sets 0, 1, and 15 when they are written to the cache memory 3. Therefore, as shown in (c) in FIG. 14, when written from the main memory 2 to the cache memory 3, the variable groups A, B, and C are written to the blocks corresponding to the sets 0, 1, and 15. Accordingly, there does not occur any conflict in which objects which are accessed at similar timings contend for a block with the same set number on the cache memory and try to flush other objects. This makes it possible to reduce the number of conflict misses.

FIGS. 15A-15D are diagrams for explaining a method for specifying how data items are laid out. In the case where plural objects are specified by their names in the pragma shown in FIG. 15A, and where the total size of these objects is equal to or smaller than the size of line data (128 bytes), optimization is performed in a way that allows such objects to be laid in the same set on the cache memory 3. When the total size of the objects exceeds 128 bytes, on the other hand, such objects are placed into groups on a 128 byte basis, and optimization is performed in a way that allows objects placed into different groups to be laid in different sets on the cache memory 3.

As shown in FIG. 16, with the pragma specification of "#pragma_overlap_access_object a, b, c", for example, it is explicitly indicated by the user that integer arrays a[32], b[32], and c[32] are accessed at similar timings. In the case where the arrays a[32], b[32], and c[32] form one set of objects, the layout set information setting unit 87 places them into 128-byte groups according to this pragma. Assuming that an integer variable is 4 bytes, each of the arrays a[32], b[32], and c[32] is 128 bytes. Thus, this set of objects is split into three groups shown in FIG. 17 (groups data_a, data_b, and data_c), where the array a[32] is included in the group data_a, the array b[32] is included in the group data_b, and the array c[32] is included in the group data_c.

After such grouping processing, the layout set information setting unit 87 assigns different set numbers to the respective groups. For example, set numbers 0, 1, and 2 are assigned to the groups data_a, data_b, and data_c, respectively.

Then, the layout set information setting unit 87 generates intermediate codes that allow the objects of the respective groups to be laid out in corresponding blocks on the cache memory 3 whose set numbers are assigned in the above group number setting processing.

The use of the pragma shown in FIG. 15B makes it possible to specify set numbers on the cache memory 3 on which objects are to be laid out. As shown in FIG. 18, for example, in the case where "#pragma_cache_set_number=0 i", "#pragma _cache_set_number=1 j" and "#pragma_cache_set_number=2 k" are specified in the source program 72, intermediate codes are generated that allow the arrays i, j, and k to be laid out in the sets with the set numbers 0, 1, and 2 on the cache memory 3, respectively.

In the case of the pragma shown in FIG. 15C, the layout set information setting unit 87 generates intermediate codes that allow an object to be stored into a location at a specified address on the main memory 2 by specifying the name and address of such object. This method is employed, for example, in the case where an address of location into which an object is desirably stored is known beforehand according to the profile information 64 and the tuning hint information 94.

In the case where a directive is given to the compiler by means of the compilation option shown in FIG. 15D, the layout set information setting unit 87 generates intermediate codes that determine addresses on the cache memory 3 of objects whose lifetimes overlap so that such objects are laid out in different sets on the cache memory 3, and that allow such objects to be laid in the corresponding addresses.

Through the above data layout specification processing, it is possible to cause no conflict in which objects contend for a block with the same set number on the cache memory and try to flush other objects. This makes it possible to reduce the number of conflict misses.

(4) Memory Space Specification Processing

Figure 20:
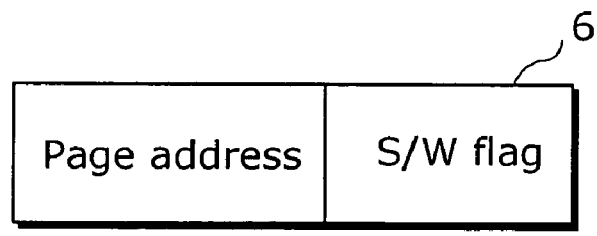
FIG. 20 is a diagram showing information stored in a dedicated register DPTEL.

As described above, the main memory 2 includes four types of memory spaces (cacheable space, weak space, sub-cache space, and uncacheable space). FIGS. 19A-19C are diagrams showing a method for specifying spaces where objects are to be stored. The processor 1 is equipped with the dedicated register 6 (dedicated register DPTEL) as described above. FIG. 20 is a diagram showing information stored in the dedicated register DPTEL. Stored in the dedicated register DPTEL are a page address on the main memory 2, and an S/W flag indicating whether it is a sub-cache space or a weak space. Note that there are four dedicated registers DPTEL, which are numbered 0 to 3, respectively.

When the pragma shown in FIG. 19A is specified in the source program 72, the layout set information setting unit 87 generates an intermediate code that allows a specified variable to be laid in a location at a page address included in a dedicated register DPTEL with a specified number. Note that whether the page address is a sub-cache space or a weak space is specified by the S/W flag included in the dedicated register DPTEL. For example, a sub-cache space is specified when the value of the S/W flag is 1, whereas a weak space is specified when the value of the S/W flag is 0.

When the compilation option shown in FIG. 19B is specified at compilation time, the layout set information setting unit 87 generates, based on the profile information 64, an intermediate code that allows a variable to be laid in a space on the main memory 2, i.e. one of a sub-cache space, a weak space, and an uncacheable space, that is effective for laying out such variable. For example, in the case where a large array is referred to only once, the layout set information setting unit 87 generates an intermediate code for laying such array in a sub-cache space, since the frequency at which this array is accessed is low.

When the pragma shown in FIG. 19C is specified in the source program 72, the layout set information setting unit 87 checks whether it is effective to lay, in a specific space, a variable specified in the pragma, based on the profile information 64, and generates an intermediate code that allows such specified variable to be laid in such space, when it is effective to do so.

As described above, it is possible to prevent the occurrence of conflict miss by laying objects in appropriate spaces. For example, the use of sub-cache space makes it possible to prevent an object that is frequently used on the cache memory 3 from being flushed from the cache memory 3. Furthermore, the use of weak space makes it possible to set a weak bit W to a less frequently-used object so as to discard such object preferentially from the cache memory 3.

(5) Cache Command Insertion Processing

The following describes built-in function for specifying, in the source program 72, a dedicated command executed by the cache control unit 5.

FIGS. 21A-21H are diagrams showing built-in functions.

The function shown in FIG. 21A is a function that causes the cache control unit 5 to execute the following processing: processing for previously reading, into the cache memory 3, a location on the main memory 2 that is specified by an argument (hereinafter also referred to as "fill processing"); and processing for writing back necessary line data that is required to be written back (hereinafter also referred to as "write back processing"). Note that a location on the main memory 2 is specified by an argument based on a variable name (the top address of such variable) or an address, and the size from such address.

The function shown in FIG. 21B is a function that causes the cache control unit 5 to execute fill processing and processing for setting a weak flag W to 1 (hereinafter also referred to as "weaken processing").

The function shown in FIG. 21C is a function that causes the cache control unit 5 to execute the following processing: processing only for previously ensuring a cache entry corresponding to a location on the main memory 2 specified as an argument (hereinafter also referred to as "touch processing"); and write back processing.

The function shown in FIG. 21D is a function that causes the cache control unit 5 to execute touch processing and weaken processing.

The function shown in FIG. 21E is a function that causes the cache control unit 5 to execute write back processing and processing for invalidating a cache entry on the cache memory 3 corresponding to a location on the main memory 2 specified as an argument (hereinafter also referred to as "invalidate processing").

The function shown in FIG. 21F is a function that causes the cache control unit 5 to execute invalidate processing.

The function shown in FIG. 21G is a function that causes the cache control unit 5 to execute touch processing The function shown in FIG. 21H is a function that causes the cache control unit 5 to execute fill processing If the functions shown in FIGS. 21A-21H are included in the source program 72, the cache command insertion unit 88 generates intermediate codes for causing the cache control unit 5 to execute the above processing.

It is possible to cause the cache control unit 5 to execute a dedicated command by registering, with the dedicated register TACSTAD of the cache control unit 5, the start address of a target location on the main memory 2, registering the size from such start address with the dedicated register TACTSZ, and then registering the command with the dedicated register TACM.

Therefore, the cache command insertion unit 88 generates intermediate codes as shown in FIG. 22, for example. Note that such intermediate codes are written on the assumption that the processor 1 has a very long instruction word (VLIW) architecture. First, a command is written to the general-purpose register r0, and then to the dedicated register TACM. At the same time, the size is written to the general-purpose register 1. When the writing to the dedicated register TACM is successful, the flag C0 is set to 1, and the flag C1 is set to 0. When the writing to the dedicated register TACM fails, the flag C0 is set to 0, and the flag C1 is set to 1. Thus, when the writing to the dedicated register TACM is successful, commands in the third and fourth lines are executed, and the size and the start address are set to the dedicated register TACSZ and the dedicated register TACSTAD, respectively. When the writing to the dedicated register TACM fails, a command in the fifth line is executed, and processing is executed again from the first line.

As described above, by allowing the user to specify a command to be executed by the cache control unit 5, it becomes possible for the user to specify, in details, how the cache memory 3 is to be controlled. This consequently makes it possible to prevent the occurrence of initial miss, capacity miss, and conflict miss.

Note that in the case of a built-in function for executing fill processing, the present invention may also be configured so that fill processing is executed a specified number of cycles or a default number of cycles before, as in the case of prefetch instruction insertion process.

Moreover, it is also possible to use a built-in function that checks whether a command to be executed by the cache control unit 5 is operating effectively or not by checking the profile information 64. FIGS. 23A-23H are diagrams showing built-in functions for checking whether the built-in functions shown in FIGS. 21A-21H are operating effectively or not. In other words, the built-in functions shown in FIGS. 23A-23H execute processes that are the same as those of the built-in functions shown in FIGS. 21A-21H and output, as the tuning hint information 94, whether or not the respective built-in functions are operating effectively or not. Moreover, the built-in functions shown in FIGS. 23A-23H may also be configured so that they automatically delete invalid cache commands (intermediate codes to be executed by the cache control unit 5) and adjust the locations at which such intermediate codes are laid out. Accordingly, it becomes possible for the user to insert optimum built-in functions into the source program by reference to the outputted tuning hint information 94, and thus to make efficient use of the cache memory 3.

FIGS. 24A-24E are diagrams for explaining a method for specifying a variety of information to be inputted/outputted to and from the compiler 58, when the above-described processing (1) to (5) is executed. FIG. 24A shows a compilation option for inputting, to the compiler 58, information related to the cache memory 3. This compilation option is used, by being described as shown in FIG. 24B. Note that FIG. 24C shows an example of the information related to the cache memory 3, which describes the size of the cache memory 3, the size of line data, the number of latency cycles of the cache memory 3, and the like.

FIG. 24D shows a compilation option for specifying a file name of the profile information 64 to be inputted to the compiler 58. FIG. 24E shows a compilation option for specifying an output file name of the tuning hint information 94 to be outputted from the compiler 58.

As described above, the compilation system according to the present embodiment is capable of preventing the occurrence of initial miss, capacity miss, and conflict miss on the cache memory 3 by use of a variety of specification methods.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention. For example, directive does not have to be provided to the compiler in the form of pragma directive, and therefore it is also possible to use built-in function or compilation option when it is possible to do so. The same effect can be achieved if built-in function or compilation option is used for providing directive to the compiler.

INDUSTRIAL APPLICABILITY

The present invention is applicable to a compiler, and particularly to a compiler and the like targeting at a processor that uses a cache memory.

What is claimed is:
1. A computing device comprising:
a processor; and
a compiler apparatus that translates a source program written in a high-level language into a machine language program, the compiler apparatus comprising:
a directive obtainment unit operable to obtain a directive that the machine language program to be generated should be optimized;
a parser unit operable to parse the source program;
an intermediate code conversion unit operable to convert the source program into intermediate codes based on a result of the parsing performed by the parser unit;
an optimization unit operable to optimize the intermediate codes according to the directive; and
a code generation unit operable to convert the intermediate codes into the machine language program,
wherein the directive is a directive to optimize the machine language program to effectively utilize a data cache memory,
wherein the directive obtainment unit obtains a directive that a specific loop process in the source program should be divided into a plurality of loop sub-processes so that data objects included in said loop process are laid in the data cache memory in units of a predetermined data size, and
the optimization unit divides, into a plurality of loop sub-processes, the loop process according to said directive, said loop process being a target of the directive obtained by the directive obtainment unit.
2. The computing device according to claim 1,
wherein the directive obtained from the source program by the directive obtainment unit is a pragma directive.
3. The computing device according to claim 1,
wherein the directive obtained from the source program by the directive obtainment unit is a built-in function.
4. A computing device comprising:
a processor; and
a compiler apparatus that translates a source program written in a high-level language into a machine language program, the compiler apparatus comprising:

a directive obtainment unit operable to obtain a directive that the machine language program to be generated should be optimized;

a parser unit operable to parse the source program;

an intermediate code conversion unit operable to convert the source program into intermediate codes based on a result of the parsing performed by the parser unit;

an optimization unit operable to optimize the intermediate codes according to the directive; and a code generation unit operable to convert the intermediate codes into the machine language program, wherein the directive is a directive to optimize the machine language program to effectively utilize a data cache memory, and wherein the directive obtainment unit obtains a directive that a specific loop process in the source program should be divided into a plurality of loop sub-processes so that data objects included in said loop process are laid in the data cache memory in units of a designated data size, and the optimization unit divides, into a plurality of loop sub-processes, the loop process according to said directive, said loop process being a target of the directive obtained by the directive obtainment unit.

5. A computing device comprising:

a processor; and a compiler apparatus that translates a source program written in a high-level language into a machine language program, the compiler apparatus comprising:

a directive obtainment unit operable to obtain a directive that the machine language program to be generated should be optimized;

a parser unit operable to parse the source program;

an intermediate code conversion unit operable to convert the source program into intermediate codes based on a result of the parsing performed by the parser unit;

an optimization unit operable to optimize the intermediate codes according to the directive; and a code generation unit operable to convert the intermediate codes into the machine language program, wherein the directive is a directive to optimize the machine language program to effectively utilize a data cache memory, wherein the directive obtainment unit obtains a directive that a specific loop process in the source program should be divided into a plurality of loop sub-processes each of which consists of a predetermined number of loops, and the optimization unit divides, into a plurality of loop sub-processes, the loop process according to said directive, said loop process being a target of the directive obtained by the directive obtainment unit.

6. A computing device comprising:

a processor; and a compiler apparatus that translates a source program written in a high-level language into a machine language program, the compiler apparatus comprising:

a directive obtainment unit operable to obtain a directive that the machine language program to be generated should be optimized;

a parser unit operable to parse the source program;

an intermediate code conversion unit operable to convert the source program into intermediate codes based on a result of the parsing performed by the parser unit;

an optimization unit operable to optimize the intermediate codes according to the directive; and a code generation unit operable to convert the intermediate codes into the machine language program, wherein the directive is a directive to optimize the machine language program to effectively utilize a data cache memory, wherein the directive obtainment unit obtains a directive that a specific loop process in the source program should be divided into a plurality of loop sub-processes each of which consists of a designated number of loops, and the optimization unit divides, into a plurality of loop sub-processes, the loop process according to said directive, said loop process being a target of the directive obtained by the directive obtainment unit.

7. A computing device comprising:

a processor; and a compiler apparatus that translates a source program written in a high-level language into a machine language program, the compiler apparatus comprising:

a directive obtainment unit operable to obtain a directive that the machine language program to be generated should be optimized;

a parser unit operable to parse the source program;

an intermediate code conversion unit operable to convert the source program into intermediate codes based on a result of the parsing performed by the parser unit;

an optimization unit operable to optimize the intermediate codes according to the directive; and a code generation unit operable to convert the intermediate codes into the machine language program, wherein the directive is a directive to optimize the machine language program to effectively utilize a data cache memory, wherein the directive obtainment unit obtains a directive that it should be checked whether or not a data object used in a specific loop process in the source program causes a cache miss on the data cache memory, and the optimization unit checks whether or not the data object causes a cache miss on the data cache memory according to said directive, and outputs a result of the check to a file.

8. The computing device according to claim 7, wherein the directive obtainment unit further obtains, together with a directive that the source program should be translated, a directive that the result of the check should be outputted to the file with a designated file name.

9. A computing device comprising:

a processor; and a compiler apparatus that translates a source program written in a high-level language into a machine language program, the compiler apparatus comprising:

a directive obtainment unit operable to obtain a directive that the machine language program to be generated should be optimized;

a parser unit operable to parse the source program;

an intermediate code conversion unit operable to convert the source program into intermediate codes based on a result of the parsing performed by the parser unit;

an optimization unit operable to optimize the intermediate codes according to the directive; and a code generation unit operable to convert the intermediate codes into the machine language program, wherein the directive is a directive to optimize the machine language program to effectively utilize a data cache memory, wherein the directive obtainment unit obtains a directive that a specific data object in the source program should be stored into the data cache memory before said data object is referred to, and the optimization unit causes said data object to be stored into the data cache memory before said data object is referred to.

10. The computing device according to claim 9,
wherein the optimization unit causes an instruction to be executed a predetermined number of cycles before said data object is referred to, said instruction indicating that the data object should be previously stored into the data cache memory.

11. The computing device according to claim 9,
wherein the directive obtainment unit obtains (i) the directive that the specific data object in the source program should be stored into the data cache memory before said data object is referred to, and (ii) a number of cycles, and
the optimization unit causes an instruction to be executed said number of cycles before the data object is referred to, said instruction indicating that the data object should be previously stored into the data cache memory, and said number of cycles being obtained by the directive obtainment unit.

12. A computing device comprising:
a processor; and
a compiler apparatus that translates a source program written in a high-level language into a machine language program, the compiler apparatus comprising:
a directive obtainment unit operable to obtain a directive that the machine language program to be generated should be optimized;
a parser unit operable to parse the source program;
an intermediate code conversion unit operable to convert the source program into intermediate codes based on a result of the parsing performed by the parser unit;
an optimization unit operable to optimize the intermediate codes according to the directive; and
a code generation unit operable to convert the intermediate codes into the machine language program,
wherein the directive is a directive to optimize the machine language program to effectively utilize a data cache memory,
wherein the directive obtainment unit obtains a directive that a specific array used in a loop process in the source program should be stored into the data cache memory before an element in said array is referred to, and
the optimization unit causes the element in said array to be stored into the data cache memory before said element is referred to.

13. The computing device according to claim 12,
wherein the optimization unit causes the element in the array to be stored into the data cache memory on an iteration that is performed ahead of an iteration in the loop process on which said element is referred to.

14. The computing device according to claim 12,
wherein the optimization unit causes an instruction to be executed a predetermined number of cycles before said element in the array is referred to, said instruction indicating that said element should be previously stored into the data cache memory.

15. The computing device according to claim 14,
wherein the optimization unit causes the instruction to be executed on an iteration that is performed a predetermined number of iterations ahead of an iteration in the loop process on which said element in the array is referred to, said instruction indicating that said element should be previously stored into the data cache memory.

16. The computing device according to claim 12,
wherein the directive obtainment unit obtains (i) the directive that the specific array used in the loop process in the source program should be stored into the data cache memory before an element included in said array is referred to, and (ii) a number of cycles, and
the optimization unit causes an instruction to be executed said number of cycles before the element in said array is referred to, said instruction indicating that said element should be previously stored into the data cache memory, and said number of cycles being obtained by the directive obtainment unit.

17. A computing device comprising:
a processor; and
a compiler apparatus that translates a source program written in a high-level language into a machine language program, the compiler apparatus comprising:
a directive obtainment unit operable to obtain a directive that the machine language program to be generated should be optimized;
a parser unit operable to parse the source program;
an intermediate code conversion unit operable to convert the source program into intermediate codes based on a result of the parsing performed by the parser unit;
an optimization unit operable to optimize the intermediate codes according to the directive; and
a code generation unit operable to convert the intermediate codes into the machine language program,
wherein the directive is a directive to optimize the machine language program to effectively utilize a data cache memory,
wherein the directive obtainment unit obtains, together with a directive that the source program should be translated, a compile directive that a specific data object should be stored into the data cache memory before said data object is referred to, said data object being judged to be causing a cache miss on the data cache memory based on an execution analysis result that is obtained by analyzing execution of the machine language program, and
the optimization unit causes said specific data object to be stored into the data cache memory before said data object is referred to.

18. The computing device according to claim 17,
wherein the directive obtainment unit further obtains a number of cycles, and
the optimization unit causes an instruction to be executed said number of cycles before the specific data object is referred to, said instruction indicating that said data object should be previously stored into the data cache memory.

19. The computing device according to claim 17,
wherein the directive obtainment unit includes:
a first obtainment unit operable to obtain the compile directive; and
a second obtainment unit operable to obtain an intra-source program directive that the specific data object placed in a designated location or a subsequent location within the source program should be processed in accordance with the compile directive, and
in the case where the first obtainment unit obtains the compile directive, the optimization unit causes said specific data object to be stored into the data cache memory before said data object is referred to, said specific data object being placed in the designated location specified in the intra-source program directive or a subsequent location, said intra-source program directive having been obtained by the second obtainment unit.

20. The computing device according to claim 17,
wherein the directive obtainment unit further obtains, together with the directive that the source program should be translated, a directive that the execution analysis result with a designated file name should be read in, and the optimization unit further reads in the execution analysis result with the designated file name according to said directive that the execution analysis result with a designated file name should be read in.

21. The computing device according to claim 17,
wherein the compile directive that is obtained by the directive obtainment unit together with the directive that the source program should be translated, is a compilation option.

22. A computing device comprising:
a processor; and
a compiler apparatus that translates a source program written in a high-level language into a machine language program, the compiler apparatus comprising:
a directive obtainment unit operable to obtain a directive that the machine language program to be generated should be optimized;
a parser unit operable to parse the source program;
an intermediate code conversion unit operable to convert the source program into intermediate codes based on a result of the parsing performed by the parser unit;
an optimization unit operable to optimize the intermediate codes according to the directive; and
a code generation unit operable to convert the intermediate codes into the machine language program,
wherein the directive is a directive to optimize the machine language program to effectively utilize a data cache memory,
wherein the directive obtainment unit obtains (i) a directive that a specific data object in the source program should be stored into the data cache memory before said data object is referred to, said data object being judged to be causing a cache miss on the data cache memory based on an execution analysis result that is obtained by analyzing execution of the machine language program, and (ii) a range in the source program, and
the optimization unit causes the specific data object to be stored into the data cache memory before said data object is referred to, said data object being included within said range in the source program.

23. A computing device comprising:
a processor; and
a compiler apparatus that translates a source program written in a high-level language into a machine language program, the compiler apparatus comprising:
a directive obtainment unit operable to obtain a directive that the machine language program to be generated should be optimized;
a parser unit operable to parse the source program;
an intermediate code conversion unit operable to convert the source program into intermediate codes based on a result of the parsing performed by the parser unit;
an optimization unit operable to optimize the intermediate codes according to the directive; and
a code generation unit operable to convert the intermediate codes into the machine language program,
wherein the directive is a directive to optimize the machine language program to effectively utilize a data cache memory,
wherein the directive obtainment unit obtains (i) a directive that a specific data object in the source program should be stored into the data cache memory before said data object is referred to, said data object being judged to be causing a cache miss on the data cache memory based on an execution analysis result that is obtained by analyzing execution of the machine language program, and (ii) a location on a main memory that is used by the processor, and the optimization unit causes said specific data object to be stored into the data cache memory before said data object is referred to, said data object being included in said location on the main memory.

24. The computing device according to claim 23,
wherein the directive obtainment unit further obtains a number of cycles, and
the optimization unit causes an instruction to be executed said number of cycles before said data object is referred to, said instruction indicating that the specific data object included in the location on the main memory should be previously stored into the data cache memory.

25. The computing device according to claim 23,
wherein the optimization unit does not cause the specific data object included in the location on the main memory to be previously stored into the data cache memory, in the case where it is judged that said data object cannot be stored into the data cache memory before said data object is referred to based on the execution analysis result.

26. A computing device comprising:
a processor; and
a compiler apparatus that translates a source program written in a high-level language into a machine language program, the compiler apparatus comprising:
a directive obtainment unit operable to obtain a directive that the machine language program to be generated should be optimized;
a parser unit operable to parse the source program;
an intermediate code conversion unit operable to convert the source program into intermediate codes based on a result of the parsing performed by the parser unit;
an optimization unit operable to optimize the intermediate codes according to the directive; and
a code generation unit operable to convert the intermediate codes into the machine language program,
wherein the directive is a directive to optimize the machine language program to effectively utilize a data cache memory,
wherein the directive obtainment unit obtains (i) a directive that specific data objects in the source program should be placed into groups in units of a size of line data on the data cache memory and that data objects placed into different groups should be laid in cache entries with different set numbers on the data cache memory, and (ii) names of the specific data objects, and
the optimization unit places the specific data objects that are specified by the respective names into groups in units of the size of line data on the data cache memory, and lays said specific data objects on cache entries so that data objects placed into different groups are not laid in any cache entries with the same set number on the data cache memory.

27. A computing device comprising:
a processor; and
a compiler apparatus that translates a source program written in a high-level language into a machine language program, the compiler apparatus comprising:
a directive obtainment unit operable to obtain a directive that the machine language program to be generated should be optimized;
a parser unit operable to parse the source program;

an intermediate code conversion unit operable to convert the source program into intermediate codes based on a result of the parsing performed by the parser unit;

an optimization unit operable to optimize the intermediate codes according to the directive; and a code generation unit operable to convert the intermediate codes into the machine language program, wherein the directive is a directive to optimize the machine language program to effectively utilize a data cache memory, wherein the directive obtainment unit obtains (i) a directive that a specific data object in the source program should be laid in a cache entry with a specific number on the data cache memory that is associated with said specific data object, (ii) a name of said specific data object, and (iii) said specific set number that is associated with the specific data object, and the optimization unit causes the specific data object that is specified by said name to be laid in the cache entry with the specific set number on the data cache memory that is associated with said specific data object.

28. A computing device comprising:

a processor; and a compiler apparatus that translates a source program written in a high-level language into a machine language program, the compiler apparatus comprising:

a directive obtainment unit operable to obtain a directive that the machine language program to be generated should be optimized;

a parser unit operable to parse the source program;

an intermediate code conversion unit operable to convert the source program into intermediate codes based on a result of the parsing performed by the parser unit;

an optimization unit operable to optimize the intermediate codes according to the directive; and a code generation unit operable to convert the intermediate codes into the machine language program, wherein the directive is a directive to optimize the machine language program to effectively utilize a data cache memory, wherein the directive obtainment unit obtains (i) a directive that a specific data object in the source program should be laid in a location at a specific address on a main memory that is used by the processor, (ii) a name of said specific data object, and (iii) said address, and the optimization unit causes the specific data object that is specified by said name to be laid in the location at the specific address on the main memory that is used by the processor.

29. A computing device comprising:

a processor; and a compiler apparatus that translates a source program written in a high-level language into a machine language program, the compiler apparatus comprising:

a directive obtainment unit operable to obtain a directive that the machine language program to be generated should be optimized;

a parser unit operable to parse the source program;

an intermediate code conversion unit operable to convert the source program into intermediate codes based on a result of the parsing performed by the parser unit;

an optimization unit operable to optimize the intermediate codes according to the directive; and a code generation unit operable to convert the intermediate codes into the machine language program, wherein the directive is a directive to optimize the machine language program to effectively utilize a data cache memory, wherein the directive obtainment unit obtains, together with a directive that the source program should be translated, a directive (i) that an address of a location should be determined based on an execution analysis result that is obtained by analyzing execution of the machine language program, said location being where a data object included in the source program should be stored, and (ii) that said data object should be stored into the location at the determined address in the main memory that is used by the processor, and the optimization unit causes an address of a location to be determined based on an execution analysis result that is obtained by analyzing execution of the machine language program, said location being where the data object included in the source program is to be stored, and causes said data object to be stored into said location at said determined address on the main memory.

30. A computing device comprising:

a processor; and a compiler apparatus that translates a source program written in a high-level language into a machine language program, the compiler apparatus comprising:

a directive obtainment unit operable to obtain a directive that the machine language program to be generated should be optimized;

a parser unit operable to parse the source program;

an intermediate code conversion unit operable to convert the source program into intermediate codes based on a result of the parsing performed by the parser unit;

an optimization unit operable to optimize the intermediate codes according to the directive; and a code generation unit operable to convert the intermediate codes into the machine language program, wherein the directive is a directive to optimize the machine language program to effectively utilize a data cache memory, wherein each of a plurality of cache entries in the data cache memory includes a weak flag having a value indicating that a data object stored in each of said plurality of cache entries should be preferentially discarded, a main memory to be used by the processor includes (i) a weak space in which a data object stored therein is to be laid out in one of the cache entries in the data cache memory and in which the weak flag of said cache entry is set to a value when said layout is carried out, said value allowing said data object to be preferentially discarded, and (ii) a cacheable space in which a data object stored therein is to be laid out in one of the cache entries in the data cache memory and in which the weak flag of said cache entry is not set to a value when said layout is carried out, said value allowing said data object to be preferentially discarded, the directive obtainment unit obtains (i) a directive that a specific data object in the source program should be stored into the weak space or the cacheable space depending on layout information that indicates whether said specific data object should be laid out in the weak space or the cacheable space, (ii) a name of said specific data object, and (iii) said layout information, and the optimization unit causes the specific data object specified by said name to be laid in either the weak space or the cacheable space according to the layout information.

31. A computing device comprising:

a processor; and a compiler apparatus that translates a source program written in a high-level language into a machine language program, the compiler apparatus comprising:

a directive obtainment unit operable to obtain a directive that the machine language program to be generated should be optimized;

a parser unit operable to parse the source program;

an intermediate code conversion unit operable to convert the source program into intermediate codes based on a result of the parsing performed by the parser unit;

an optimization unit operable to optimize the intermediate codes according to the directive; and a code generation unit operable to convert the intermediate codes into the machine language program, wherein the directive is a directive to optimize the machine language program to effectively utilize a data cache memory, wherein the processor further uses a sub-cache memory that has a smaller capacity than the data cache memory, each of a plurality of cache entries in the data cache memory includes a weak flag having a value indicating that a data object stored in each of said plurality of cache entries should be preferentially discarded, a main memory to be used by the processor includes (i) a weak space in which a data object stored therein is to be laid out in one of the cache entries in the data cache memory and in which the weak flag of said cache entry is set to a value when said layout is carried out, said value allowing said data object to be preferentially discarded, (ii) a cacheable space in which a data object stored therein is to be laid out in one of the cache entries in the data cache memory and in which the weak flag of said cache entry is not set to a value when said layout is carried out, said value allowing said data object to be preferentially discarded, and (iii) a sub-cache space in which a data object stored therein is to be laid out in the sub-cache memory, the directive obtainment unit obtains, together with a directive that the source program should be translated, a directive (i) that a space on the main memory should be determined based on an execution analysis result that is obtained by analyzing execution of the machine language program, said space being where a data object included in the source program is to be laid out, and (ii) that said data object should be laid out in said determined space, and the optimization unit determines a space on the main memory in which the data object included in the source program is to be stored based on an execution analysis result that is obtained by analyzing execution of the machine language program, and causes said data object to be laid in said determined space.

32. A computing device comprising:

a processor; and a compiler apparatus that translates a source program written in a high-level language into a machine language program, the compiler apparatus comprising:

a directive obtainment unit operable to obtain a directive that the machine language program to be generated should be optimized;

a parser unit operable to parse the source program;

an intermediate code conversion unit operable to convert the source program into intermediate codes based on a result of the parsing performed by the parser unit;

an optimization unit operable to optimize the intermediate codes according to the directive; and a code generation unit operable to convert the intermediate codes into the machine language program, wherein the directive is a directive to optimize the machine language program to effectively utilize a data cache memory, wherein the processor further uses a sub-cache memory that has a smaller capacity than the data cache memory, each of a plurality of cache entries in the data cache memory includes a weak flag having a value indicating that a data object stored in each of said plurality of cache entries should be preferentially discarded, a main memory to be used by the processor includes (i) a weak space in which a data object stored therein is to be laid out in one of the cache entries in the data cache memory and in which the weak flag of said cache entry is set to a value when said layout is carried out, said value allowing said data object to be preferentially discarded, (ii) a cacheable space in which a data object stored therein is to be laid out in one of the cache entries in the data cache memory and in which the weak flag of said cache entry is not set to a value when said layout is carried out, said value allowing said data object to be preferentially discarded, and (iii) a sub-cache space in which a data object stored therein is to be laid out in the sub-cache memory, the directive obtainment unit obtains a directive (i) that a space on the main memory should be determined based on an execution analysis result that is obtained by analyzing execution of the machine language program, said space being where a data object included in the source program is to be laid out and (ii) that said data object should be laid out in said determined space, and the optimization unit determines a space on the main memory in which the data object included in the source program is to be stored based on an execution analysis result that is obtained by analyzing execution of the machine language program, and causes said data object to be laid in said determined space.

33. A computing device comprising:

a processor; and a compiler apparatus that translates a source program written in a high-level language into a machine language program, the compiler apparatus comprising:

a directive obtainment unit operable to obtain a directive that the machine language program to be generated should be optimized;

a parser unit operable to parse the source program;

an intermediate code conversion unit operable to convert the source program into intermediate codes based on a result of the parsing performed by the parser unit;

an optimization unit operable to optimize the intermediate codes according to the directive; and a code generation unit operable to convert the intermediate codes into the machine language program, wherein the directive is a directive to optimize the machine language program to effectively utilize a data cache memory, wherein the directive obtainment unit obtains, from the source program, a directive for causing a data cache memory control unit operable to control the data cache memory to execute a dedicated command that is dedicated to said data cache memory control unit, and the optimization unit causes the data cache memory control unit to execute said dedicated command according to the directive.

34. The computing device according to claim 33, wherein the dedicated command is a command for pre-loading a designated data object from a main memory used by the processor into a predetermined cache entry on the data cache memory and for writing said data object stored in the cache entry back into the main memory when it is necessary to write back said data object to the main memory.

35. The computing device according to claim 33,
wherein each of a plurality of cache entries in the data cache memory includes a weak flag having a value indicating that a data object stored in each of said plurality of cache entries should be preferentially discarded, and
the dedicated command is a command for pre-loading a designated data object from the main memory used by the processor into a predetermined cache entry on the data cache memory and for setting the weak flag of said cache entry to a value that allows the data object stored in said cache entry to be preferentially discarded.

36. The computing device according to claim 33,
wherein the dedicated command is a command for previously securing, on the data cache memory, a cache entry in which a designated data object is to be stored and for writing said data object stored in said cache entry back into the main memory when it is necessary to write back said data object to the main memory.

37. The computing device according to claim 33,
wherein each of a plurality of cache entries in the data cache memory includes a weak flag having a value indicating that a data object stored in each of said plurality of cache entries should be preferentially discarded, and
the dedicated command is a command for previously securing, on the data cache memory, a cache entry in which a designated data object is to be stored and for setting the weak flag of said cache entry to a value that allows the data object stored in said cache entry to be preferentially discarded.

38. The computing device according to claim 33,
wherein the dedicated command is a command for writing a data object that is stored in a cache entry for storing said designated data object back into the main memory when it is necessary to write back said data object to the main memory, and for invalidating said cache entry.

39. The computing device according to claim 33,
wherein the dedicated command is a command for invalidating a cache entry for storing a designated data object.

40. The computing device according to claim 33,
wherein the dedicated command is a command for securing, on the data cache memory, a cache entry beforehand for storing a designated data object.

41. The computing device according to claim 33,
wherein the dedicated command is a command for pre-loading a designated data object from a main memory used by the processor into a predetermined cache entry on the data cache memory.

42. The computing device according to claim 33,
wherein the dedicated command is a command for further checking whether said dedicated command is operating effectively or not.

43. The computing device according to claim 33,
wherein the optimization unit further controls layout of the dedicated command, based on an execution analysis result that is obtained by analyzing execution of the machine language program.

44. The computing device according to claim 43,
wherein the optimization unit further deletes the invalid dedicated command based on the execution analysis result.

45. The computing device according to claim 43,
wherein the optimization unit further determines where to place the dedicated command based on the execution analysis result.

46. A computing device comprising:
a processor; and
a compiler apparatus that translates a source program written in a high-level language into a machine language program, the compiler apparatus comprising:
a directive obtainment unit operable to obtain a directive that the machine language program to be generated should be optimized;
a parser unit operable to parse the source program;
an intermediate code conversion unit operable to convert the source program into intermediate codes based on a result of the parsing performed by the parser unit;
an optimization unit operable to optimize the intermediate codes according to the directive; and
a code generation unit operable to convert the intermediate codes into the machine language program,
wherein the directive is a directive to optimize the machine language program to effectively utilize a data cache memory,
wherein the directive obtainment unit further obtains, together with a directive that the source program should be translated, a directive that property information of the data cache memory should be read in, and
the optimization unit reads in the property information of the data cache memory.

47. A compiler stored in a recording medium, the compiler being operable to translate a source program written in a high-level language into a machine language program, the compiler causing a computer to function as:
a directive obtainment unit operable to obtain a directive that the machine language program to be generated should be optimized;
a parser unit operable to parse the source program;
an intermediate code conversion unit operable to convert the source program into intermediate codes based on a result of the parsing performed by the parser unit;
an optimization unit operable to optimize the intermediate codes according to the directive; and
a code generation unit operable to convert the intermediate codes into the machine language program,
wherein the directive is an optimization directive to effectively utilize a data cache memory,
wherein the directive obtainment unit obtains, from the source program, a directive for causing a data cache memory control unit operable to control the data cache memory to execute a dedicated command that is dedicated to said data cache memory control unit, and
the optimization unit causes the data cache memory control unit to execute said dedicated command according to the directive.

48. A recording medium in which a compiler is stored that translates a source program written in a high-level language into a machine language program,
wherein the compiler causes a computer to function as:
a directive obtainment unit operable to obtain a directive that the machine language program to be generated should be optimized;
a parser unit operable to parse the source program;
an intermediate code conversion unit operable to convert the source program into intermediate codes based on a result of the parsing performed by the parser unit;
an optimization unit operable to optimize the intermediate codes according to the directive; and a code generation unit operable to convert the intermediate codes into the machine language program, wherein the directive is an optimization directive to effectively utilize a data cache memory, wherein the directive obtainment unit obtains, from the source program, a directive for causing a data cache memory control unit operable to control the data cache memory to execute a dedicated command that is dedicated to said data cache memory control unit, and the optimization unit causes the data cache memory control unit to execute said dedicated command according to the directive.

49. A computing device comprising:

a processor; and a development system for developing a machine language program from a source program, the development system comprising:

a compiler apparatus that translates a source program written in a high-level language into a machine language program;

a simulator apparatus that executes the machine language program generated by the compiler apparatus, and outputs an execution log; and a profiler apparatus that analyzes the execution log outputted by the simulator apparatus, and outputs an execution analysis result related to the machine language program, wherein the compiler apparatus includes:

a directive obtainment unit operable to obtain a directive that the machine language program to be generated should be optimized;

a parser unit operable to parse the source program;

an intermediate code conversion unit operable to convert the source program into intermediate codes based on a result of the parsing performed by the parser unit;

an optimization unit operable to optimize the intermediate codes according to the directive and the execution analysis result; and a code generation unit operable to convert the intermediate codes into the machine language program, wherein the directive is a directive to optimize the machine language program to effectively utilize a data cache memory, wherein the directive obtainment unit obtains, from the source program, a directive for causing a data cache memory control unit operable to control the data cache memory to execute a dedicated command that is dedicated to said data cache memory control unit, and the optimization unit causes the data cache memory control unit to execute said dedicated command according to the directive.

* * * * *